(12) United States Patent
Matsumoto et al.

(10) Patent No.: US 8,522,531 B2
(45) Date of Patent: Sep. 3, 2013

(54) CATALYST DEGRADATION DETECTION APPARATUS AND CATALYST DEGRADATION DETECTION METHOD

(75) Inventors: Takuya Matsumoto, Miyoshi (JP); Takashi Nakamura, Toyota (JP); Takeho Aisaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 252 days.

(21) Appl. No.: 13/197,358

(22) Filed: Aug. 3, 2011

(65) Prior Publication Data

US 2012/0031170 A1 Feb. 9, 2012

(30) Foreign Application Priority Data

Aug. 6, 2010 (JP) .................................. 2010-177232

(51) Int. Cl.
*F01N 3/00* (2006.01)

(52) U.S. Cl.
USPC ............. 60/277; 606/276; 606/278; 702/183; 702/185

(58) Field of Classification Search
USPC .................... 60/276–278; 702/116, 112, 183, 702/185
See application file for complete search history.

(56) References Cited

U.S. PATENT DOCUMENTS

| | | | | |
|---|---|---|---|---|
| 5,154,055 A * | 10/1992 | Nakane et al. | | 60/276 |
| 5,735,120 A * | 4/1998 | Nagai | | 60/276 |
| 5,851,376 A * | 12/1998 | Nishioka et al. | | 205/784.5 |
| 6,035,632 A * | 3/2000 | Stander et al. | | 60/274 |
| 6,073,440 A * | 6/2000 | Douta et al. | | 60/277 |
| 6,594,987 B2 * | 7/2003 | Uranishi | | 60/277 |
| 6,600,998 B1 * | 7/2003 | Majima et al. | | 702/24 |
| 6,673,619 B2 * | 1/2004 | Sawada | | 436/37 |
| 6,751,950 B2 * | 6/2004 | Ikemoto et al. | | 60/285 |
| 7,048,891 B2 * | 5/2006 | Kinugawa et al. | | 422/94 |
| 7,293,404 B2 * | 11/2007 | Enoki et al. | | 60/277 |
| 7,677,027 B2 * | 3/2010 | Iida et al. | | 60/277 |
| 7,861,514 B2 * | 1/2011 | Fujiwara et al. | | 60/277 |
| 7,885,757 B2 * | 2/2011 | Yamaguchi | | 701/109 |
| 8,065,871 B1 * | 11/2011 | Fraser | | 60/295 |
| 8,186,147 B2 * | 5/2012 | Iida | | 60/277 |
| 2007/0220863 A1 * | 9/2007 | Iida et al. | | 60/277 |
| 2008/0173008 A1 * | 7/2008 | Kidokoro et al. | | 60/277 |
| 2009/0165440 A1 * | 7/2009 | Sawada et al. | | 60/276 |
| 2010/0307135 A1 * | 12/2010 | Miyamoto et al. | | 60/277 |

FOREIGN PATENT DOCUMENTS

| | | |
|---|---|---|
| JP | 2008-031901 A | 2/2008 |
| JP | 2010-084750 A | 4/2010 |
| JP | 2011-185172 A | 9/2011 |
| WO | 2011/110912 A1 | 9/2011 |

* cited by examiner

*Primary Examiner* — David A Rogers
(74) *Attorney, Agent, or Firm* — Gifford, Krass, Sprinkle, Anderson & Citkowski, P.C.

(57) ABSTRACT

A determination oxygen storage amount used to determine whether a catalyst is degraded is a value obtained by applying a correction amount for removing error caused by response delay time of an output signal of an oxygen sensor to an oxygen storage amount calculated every short time. The correction amount is a value that is calculated using slopes stored in memory, i.e., the slopes for the number of storage cycles (>the short time) corresponding to the response delay time, or the like, and becomes more accurate as a value corresponding to the error as the storage cycle becomes relatively shorter with respect to the response delay time and the number of the slopes stored in the memory increases. The necessary storage capacity of the memory is inhibited from increasing excessively even if the number of the slopes stored in the memory is large.

7 Claims, 13 Drawing Sheets

AIR-FUEL RATIO

AIR-FUEL RATIO
SENSOR OUTPUT VAF

OXYGEN
STORAGE AMOUNT

OXYGEN CONCENTRATION
AROUND OXYGEN SENSOR

OXYGEN SENSOR
OUTPUT VO

AIR-FUEL RATIO

AIR-FUEL RATIO
SENSOR OUTPUT VAF

OXYGEN
RELEASE AMOUNT

OXYGEN CONCENTRATION
AROUND OXYGEN SENSOR

OXYGEN SENSOR
OUTPUT VO

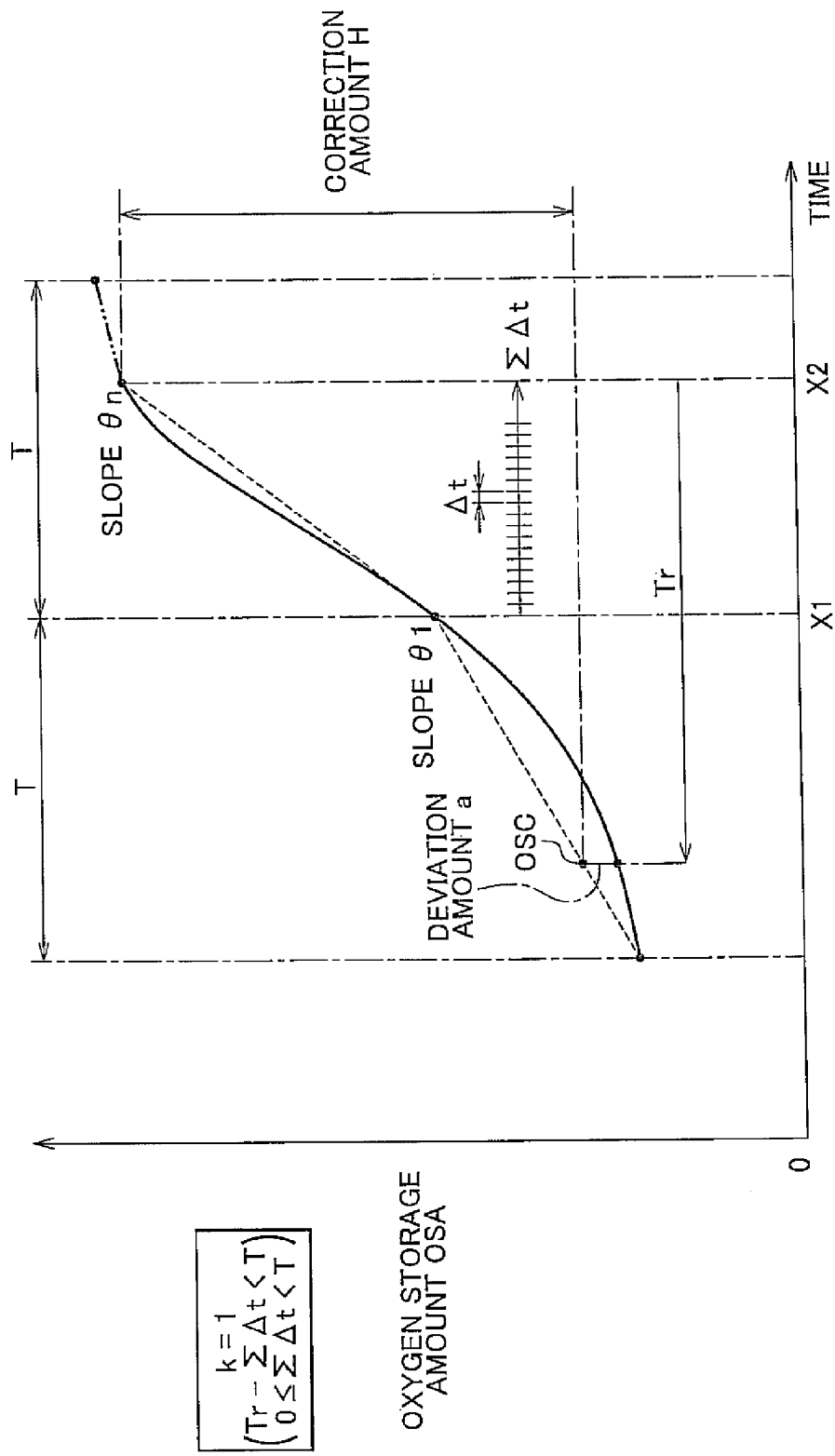

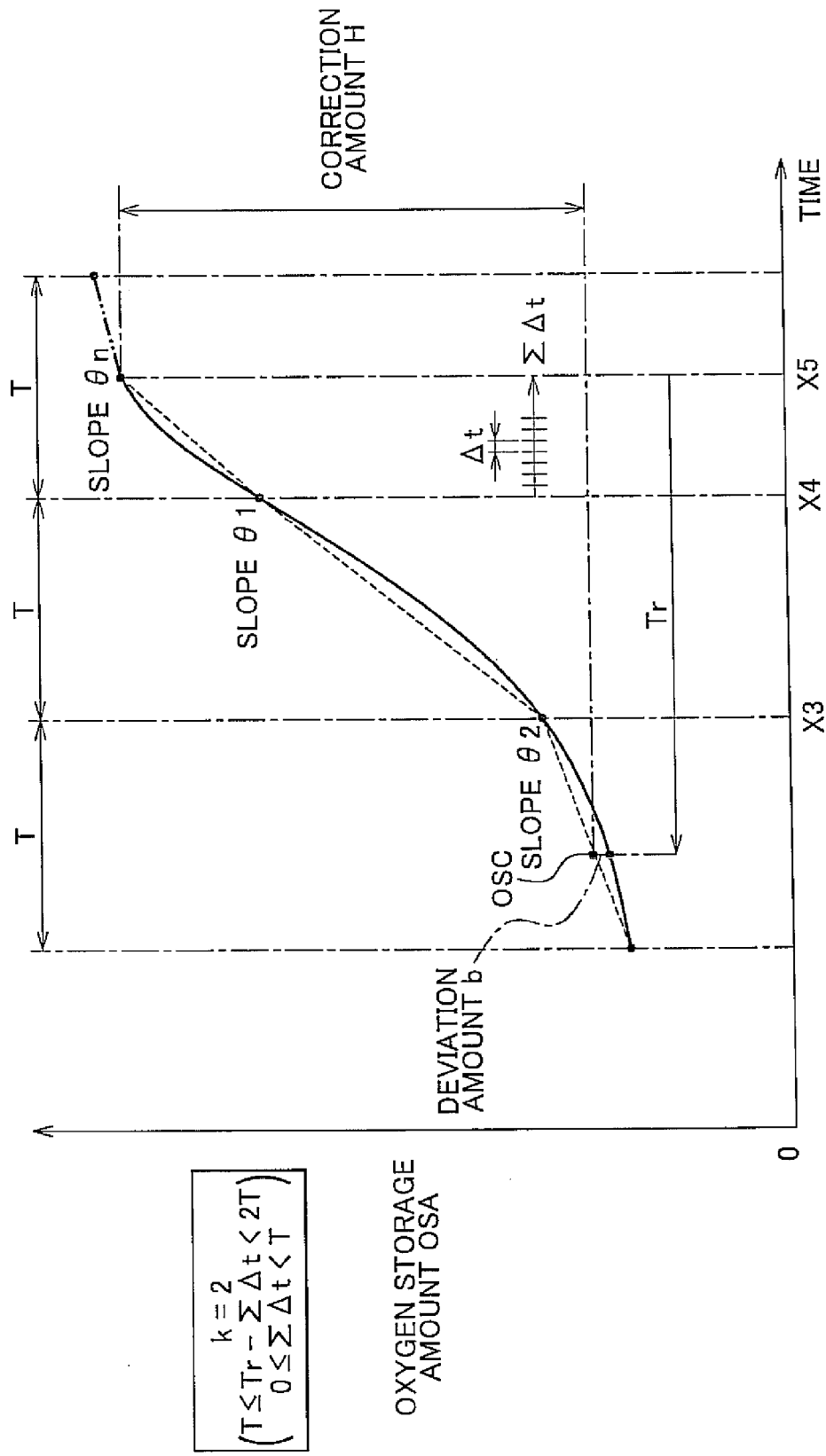

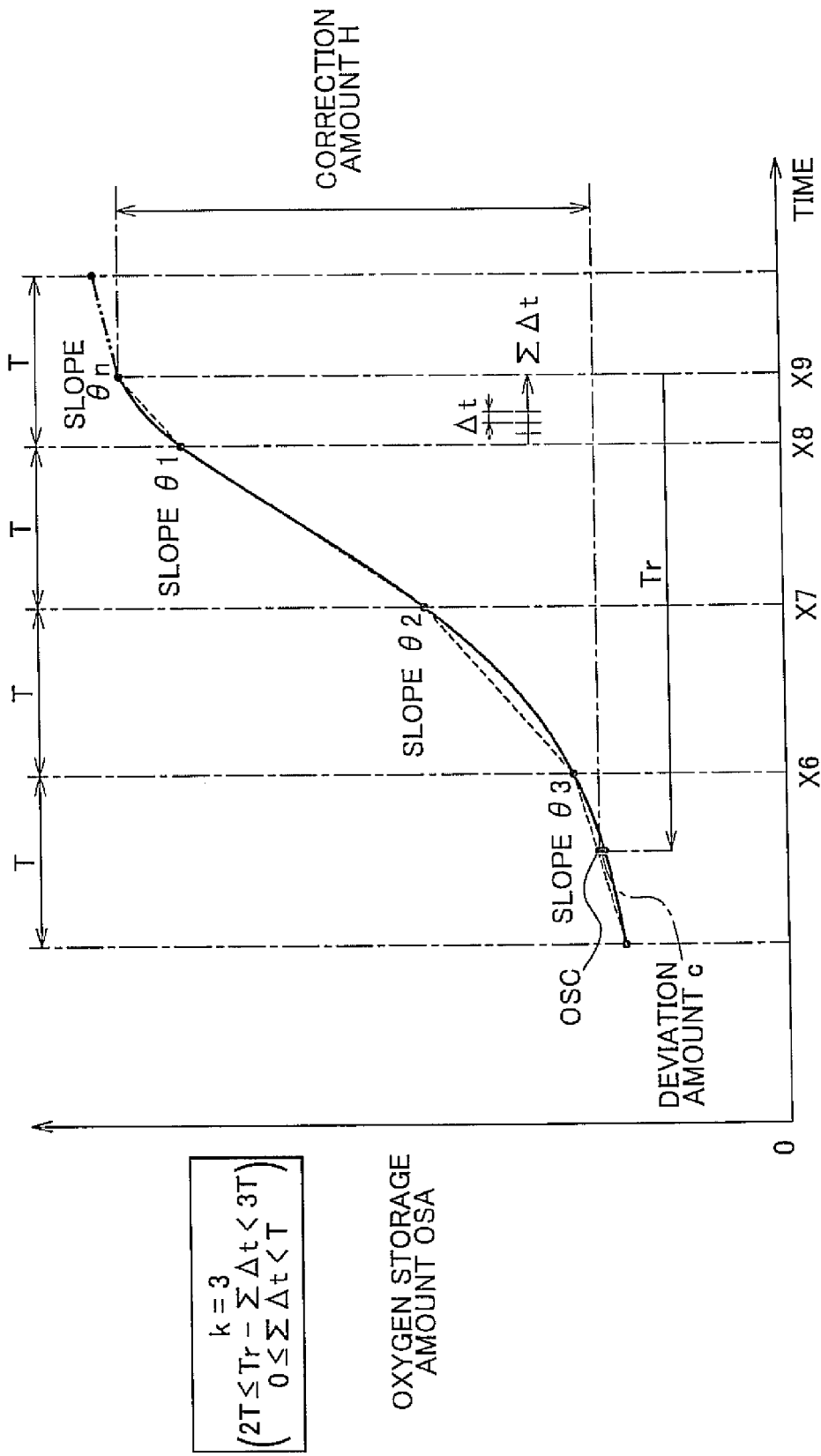

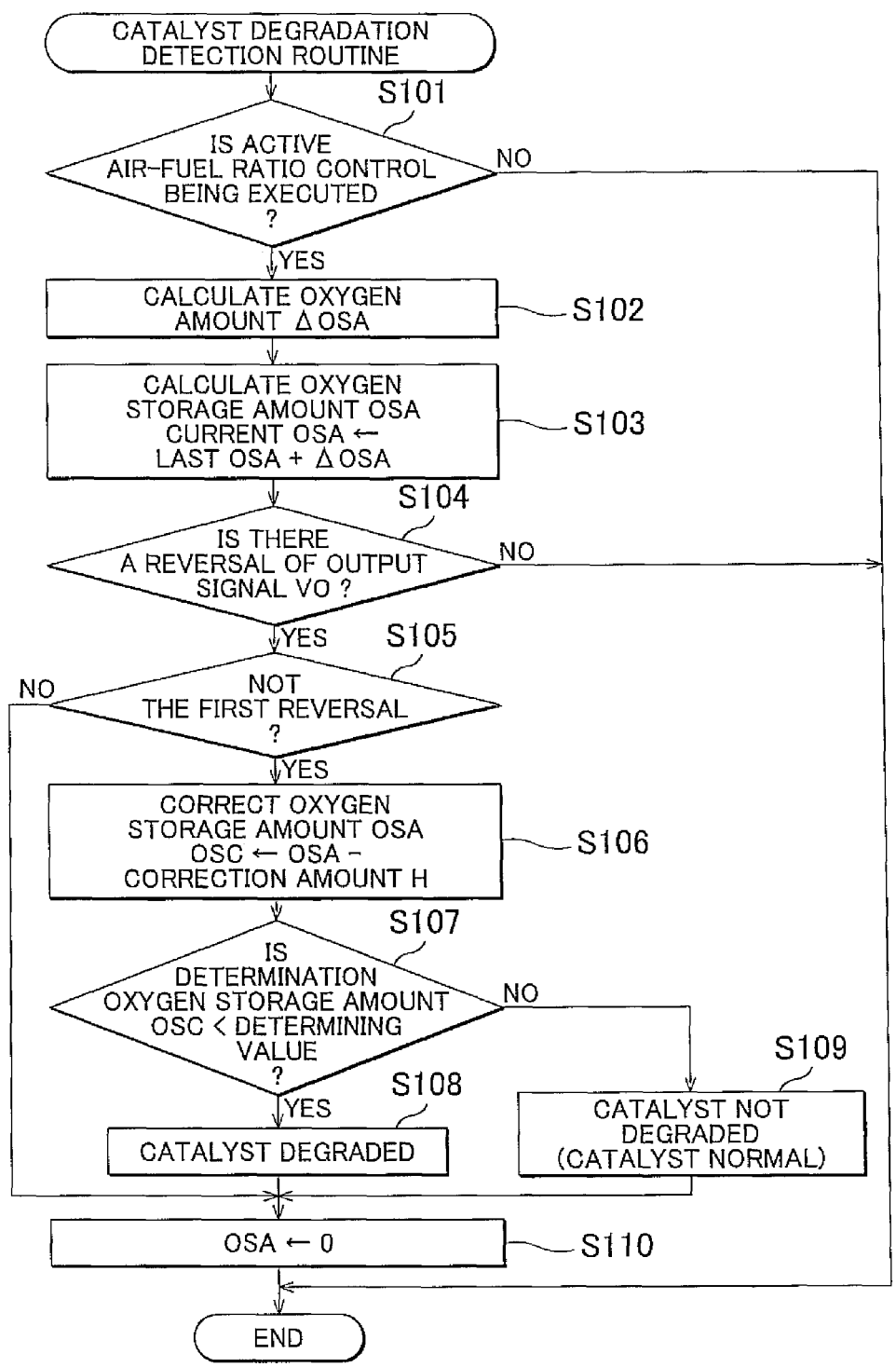

CATALYST DEGRADATION DETECTION APPARATUS AND CATALYST DEGRADATION DETECTION METHOD

CROSS-REFERENCE TO RELATED APPLICATIONS

This application claims priority to Japanese Patent Application No. 2010-177232 filed on Aug. 6, 2010, which is incorporated herein by reference in its entirety including the specification, drawings and abstract.

BACKGROUND OF THE INVENTION

1. Field of the Invention

The invention relates to a catalyst degradation detection apparatus and a catalyst degradation detection method.

2. Description of Related Art

In an internal combustion engine mounted in a vehicle such as an automobile, a catalyst for purifying exhaust gas is provided in an exhaust passage, and NOx, HC, and CO in the exhaust gas that flows through the exhaust passage is purified by this catalyst. Also, in order to effectively purify these three components in the exhaust gas, the catalyst is provided with an oxygen storage function and stoichiometric air-fuel ratio control that controls the air-fuel ratio of the air-fuel mixture in the combustion chamber of the internal combustion engine to the stoichiometric air-fuel ratio is performed.

Here, the oxygen storage function of the catalyst is a function that stores oxygen in the exhaust gas in the catalyst and releases oxygen stored in the catalyst into the exhaust gas from the catalyst, according to the oxygen concentration in the exhaust gas that passes through the catalyst. More specifically, when the oxygen concentration in the exhaust gas is greater than the value when the air-fuel mixture in the combustion chamber is combusted when the air-fuel ratio of that air-fuel mixture is the stoichiometric air-fuel ratio, i.e., when the air-fuel mixture in the combustion chamber is combusted at an air-fuel ratio that is leaner than the stoichiometric air-fuel ratio, oxygen in the exhaust gas that passes through the catalyst is stored in the catalyst by the oxygen storage function of the catalyst described above. On the other hand, when the oxygen concentration in the exhaust gas is less than the value when the air-fuel mixture is combusted when the air-fuel ratio of the air-fuel mixture in the combustion chamber is the stoichiometric air-fuel ratio, i.e., when the air-fuel mixture in the combustion chamber is an air-fuel ratio that is richer than the stoichiometric air-fuel ratio, oxygen stored in the catalyst is released from the catalyst into the exhaust gas by the oxygen storage function of the catalyst described above.

Also, in the stoichiometric air-fuel ratio control described above, the fuel injection quantity of the internal combustion engine is adjusted according to the oxygen concentration in the exhaust gas such that the oxygen concentration in the exhaust gas comes to match the value when the air-fuel mixture in the combustion chamber is combusted when the air-fuel ratio of that air-fuel mixture is the stoichiometric air-fuel ratio. This kind of stoichiometric air-fuel ratio control uses a catalyst upstream sensor that is provided upstream of the catalyst in the exhaust passage and outputs a signal based on the oxygen concentration in the exhaust gas, and a catalyst downstream sensor that is provided downstream of the catalyst in the exhaust passage and outputs a signal based on the oxygen concentration in the exhaust gas.

More specifically, the fuel injection quantity of the internal combustion engine is adjusted according to the signal output from the catalyst upstream sensor such that the oxygen concentration in the exhaust gas upstream of the catalyst will come to match the value when the air-fuel mixture in the combustion chamber is combusted when the air-fuel ratio of that air-fuel mixture is the stoichiometric air-fuel ratio. As a result, the air-fuel ratio of the air-fuel mixture in the combustion chamber of the internal combustion engine is controlled to converge on the stoichiometric air-fuel ratio while fluctuating between rich and lean. However, with only the adjustment of the fuel injection quantity according to the signal output from the catalyst upstream sensor, the center of fluctuation of the air-fuel ratio of the internal combustion engine that fluctuates between rich and lean to converge on the stoichiometric as described above may be off from the stoichiometric air-fuel ratio due to product variation of the sensor or the like. In order to correct this offset, the fuel injection quantity of the internal combustion engine is also adjusted according to the signal output from the catalyst downstream sensor, such that the center of fluctuation of the air-fuel ratio of the internal combustion engine that fluctuates between rich and lean comes to match the stoichiometric air-fuel ratio as a result of adjusting the fuel injection quantity according to the signal from the catalyst upstream sensor.

In this way, giving the catalyst an oxygen storage function and performing stoichiometric air-fuel ratio control makes it possible to effectively purify the three components in the exhaust gas, i.e., NOx, HC, and CO. More specifically, if the air-fuel ratio of the air-fuel mixture in the combustion chamber changes and becomes lean while stoichiometric air-fuel ratio control is being executed, the oxygen concentration in the exhaust gas that passes through the catalyst will become a larger value than the value when the air-fuel mixture in the combustion chamber is combusted when the air-fuel ratio of that air-fuel mixture is the stoichiometric air-fuel ratio, so oxygen in the exhaust gas that passes through the catalyst will be stored in the catalyst such that the NOx in the exhaust gas is reduced. On the other hand, if the air-fuel ratio of the air-fuel mixture in the combustion chamber changes and becomes rich while stoichiometric air-fuel ratio control is being executed, the oxygen concentration in the exhaust gas that passes through the catalyst will become a smaller value than the value when the air-fuel mixture in the combustion chamber is combusted when the air-fuel ratio of that air-fuel mixture is the stoichiometric air-fuel ratio, so oxygen stored in the catalyst is released from the catalyst, thereby oxidizing the HC and CO in the exhaust gas. As a result, when the air-fuel ratio of the air-fuel mixture in the combustion chamber fluctuates between rich and lean in the process of converging on the stoichiometric air-fuel ratio while stoichiometric air-fuel ratio control is being executed, the three components in the exhaust gas, i.e., NOx, HC, and CO, can be effectively purified as described above.

However, the oxygen storage function of the catalyst decreases as the catalyst degrades, so it is possible to obtain the maximum value of the oxygen storage amount of the catalyst and determine whether the catalyst is degraded based on this maximum value of the oxygen storage amount. This determination as to whether the catalyst is degraded is made according to the procedure below that is described in Japanese Patent Application Publication No. 2008-31901 (JP-A-2008-31901).

Active air-fuel ratio control such as that described below is executed based on a preset condition each time the maximum value of the oxygen storage amount of the catalyst is obtained. In this active air-fuel ratio control, the air-fuel ratio of the internal combustion engine reverses between rich and lean each time there is a reversal of a signal from a catalyst downstream sensor between the lean side and the rich side with respect to a value corresponding to the oxygen concentration in the exhaust gas when the fuel is combusted at the stoichiometric air-fuel ratio, after the air-fuel ratio of the internal combustion engine is forced rich or lean. In this active air-fuel ratio control, the amount of oxygen stored in the catalyst, or the amount of oxygen released from the catalyst, during a preset short time $\Delta t$ is calculated every short time $\Delta t$, during the period of time from after the air-fuel ratio of the internal combustion engine reverses between rich and lean until there is a reversal between the rich side and the lean side of the signal from the catalyst downstream sensor. The amount of oxygen is accumulated each time the amount of oxygen (hereinafter referred to as the "oxygen amount $\Delta OSA$") is calculated, i.e., every short time $\Delta t$, to determine an oxygen storage amount OSA that is indicative of the oxygen storage capacity of the catalyst.

It should be noted that if the air-fuel ratio of the internal combustion engine is changing from rich to lean as a result of the active air-fuel ratio control, oxygen will be stored in the catalyst during the period described above, so the amount of oxygen stored in the catalyst (i.e., oxygen amount $\Delta OSA$) is calculated every short time $\Delta t$ during this period. The cumulative value of the oxygen amount each times the oxygen amount $\Delta OSA$ is calculated serves as the oxygen storage amount OSA. On the other hand, if the air-fuel ratio of the internal combustion engine is changing from lean to rich as a result of the active air-fuel ratio control, oxygen will be released from the catalyst during the period described above, so the amount of oxygen released from the catalyst (i.e., oxygen amount $\Delta OSA$) is calculated every short time $\Delta t$ during this period. The cumulative value of the oxygen amount each times this oxygen amount $\Delta OSA$ is calculated serves as the oxygen storage amount OSA.

In the active air-fuel ratio control, when the signal of the catalyst downstream sensor reverses between the lean side and the rich side after the air-fuel ratio of the internal combustion engine is forced rich or lean, the oxygen storage amount OSA calculated at this time is the maximum value of the catalyst storage amount of the catalyst. Therefore, the determination as to whether the catalyst is degraded can be made based on the oxygen storage amount OSA calculated at the time that the signal of the catalyst downstream sensor reverses between the lean side and the rich side. Also, if the oxygen storage amount OSA is equal to or greater than a preset determining value, it is determined that the catalyst is not degraded (i.e., is normal), but if the oxygen storage amount OSA is less than the preset determining value, it is determined that the catalyst is degraded.

However, the oxygen storage amount OSA used in the determination of whether the catalyst is degraded is a value that includes error due to a response delay time Tr that occurs in the signal of the catalyst downstream sensor, so the oxygen storage amount OSA is a value that is off from the true value of the maximum value of the oxygen storage amount of the catalyst by the amount of this error. The response delay time Tr of the signal of the catalyst downstream sensor is the time that it takes from the time that the oxygen concentration of the exhaust gas around the catalyst downstream sensor changes, for the signal of the sensor to change to a value corresponding to the oxygen concentration after that change. If the oxygen storage amount OSA used in the determination of whether the catalyst is degraded is a value that is off from the true value of the maximum value of the oxygen storage amount of the catalyst, the determination of whether the catalyst is degraded that is based on that oxygen storage amount OSA may be inaccurate.

To deal with this problem, it is possible to use a method for determining whether a catalyst is degraded such as that described below (hereinafter referred to as a "buffer method"). That is, the oxygen storage amount OSA calculated every short time $\Delta t$ in the active air-fuel ratio control is stored each time it is calculated. The oxygen storage amount OSA that is calculated every short time $\Delta t$ in this way is a value that is accumulated in increments of the oxygen amount $\Delta OSA$ every short time $\Delta t$, so the oxygen storage amount OSA increases as shown in FIG. 14, for example, over time. Then, when determining whether the catalyst is degraded (at timing B in the drawing), i.e., when the signal of the catalyst downstream sensor reverses between the rich side and the lean side, the oxygen storage amount OSA stored at a point (i.e., timing A) the response delay time Tr of the catalyst downstream sensor before the point that this determination is made (timing B) is used as the oxygen storage amount OSA for determining whether the catalyst is degraded.

In this case, the oxygen storage amount OSA used to determine whether the catalyst is degraded no longer includes error due to the response delay time Tr of the catalyst downstream sensor. Therefore, the oxygen storage amount OSA will not be a value that is off from the true value of the maximum value of the oxygen storage amount of the catalyst by the amount of the error, so the determination of whether the catalyst is degraded that is based on the oxygen storage amount OSA will not be inaccurate. If the buffer method described above is used, the oxygen storage amount OSA (i.e., the value at timing A in the drawing) that is used to determine whether the catalyst is degraded is able to correspond to the true value of the maximum value of the oxygen storage amount of the catalyst, even if the oxygen storage amount OSA shifts in a non-linear manner as shown in FIG. 15, for example, due to the accumulation over time of the oxygen amount $\Delta OSA$ calculated every short time $\Delta t$. Thus, the determination of whether the catalyst is degraded is made based on this oxygen storage amount OSA, so the result of this determination is able to be accurate.

Using the buffer method described above as a method for determining whether the catalyst is degraded does make it possible to prevent error due to the response delay time Tr of the signal from the catalyst downstream sensor being included in the oxygen storage amount OSA used to determine whether the catalyst is degraded. More specifically, regardless of whether the oxygen storage amount OSA shifts in a linear manner or a non-linear manner over time due to the accumulation of the oxygen amount $\Delta OSA$ calculated every short time $\Delta t$, it is possible to prevent the oxygen storage amount OSA used to determine whether the catalyst is degraded from being off from the true value of the maximum value of the oxygen storage amount of the catalyst by the amount of the error.

However, in the buffer method described above, each oxygen storage amount OSA calculated every short time $\Delta t$ must be stored separately in memory or the like. Also, in order to obtain the effect described above, of the past oxygen storage amounts OSA calculated every short time $\Delta t$, the oxygen storage amount OSA for at least the number of calculations more than a value obtained by dividing the response delay time Tr by the short time $\Delta t$, and for the most recent of those calculations from the current point, must be stored separately in memory or the like. Therefore, the necessary storage capacity of the memory or the like for storing the oxygen storage amount OSA calculated every short time $\Delta t$ increases.

SUMMARY OF THE INVENTION

The invention provides a catalyst degradation detection apparatus and catalyst degradation detection method capable of removing error due to response delay time of a signal of a catalyst downstream sensor from an oxygen storage amount of a catalyst used for determining whether the catalyst is degraded, and keeping the necessary storage capacity of memory low.

According to a first aspect of the invention, an amount of oxygen stored in a catalyst provided in an exhaust passage of an internal combustion engine, or an amount of oxygen released from the catalyst, during a preset short time is calculated by an oxygen storage amount calculating portion every short time, and a value obtained by accumulating the amount of oxygen at each calculation is set as an oxygen storage amount of the catalyst. Then a determination of whether the catalyst is degraded is made based on the oxygen storage amount calculated as described above, when there is a reversal, between a lean side and a rich side with respect to a value corresponding to an oxygen concentration in exhaust gas when fuel is combusted at a stoichiometric air-fuel ratio, of the signal of a catalyst downstream sensor that is provided downstream of the catalyst in the exhaust passage of the internal combustion engine and that outputs a signal based on the oxygen concentration in exhaust gas. More specifically, a correction of a correction amount corresponding to a response delay time with respect to a change in the oxygen concentration of the signal of the catalyst downstream sensor is applied by a correcting portion to the calculated oxygen storage amount, and it is determined whether the catalyst is degraded based on the corrected oxygen storage amount.

Here, the oxygen storage amount calculated as described above is stored in memory by a first storage portion in place of a last value as a storage value in each storage cycle that is a time interval that is longer than the short time. Furthermore, a slope of a change in the calculated oxygen storage amount with respect to the storage value is calculated every short time by a slope calculating portion, and this slope is stored in the memory in each storage cycle by a second storage portion. The second storage portion stores, separately in the memory, only the slopes for the number of the storage cycles covering the response delay time of the signal of the catalyst downstream sensor, from among the slopes calculated by the slope calculating portion. Also, the correction amount for obtaining the oxygen storage amount after the correction that is used to determine whether the catalyst is degraded is calculated based on various parameters, i.e., the slopes stored in the memory, the storage cycle, the response delay time, and an elapsed time from the end of the last storage cycle.

The slopes stored in the memory, i.e., the slopes for the number of the storage cycles covering the response delay time of the signal of the catalyst downstream sensor, are included in the parameters used to calculate the correction amount. Therefore, regardless of whether the oxygen storage amount calculated by the oxygen storage amount calculating portion shifts in a linear manner or a non-linear manner over time, it is possible to make the correction amount calculated based on the slopes and the like a value corresponding to the error in the calculated oxygen storage amount that is due to the response delay time of the signal of the catalyst downstream sensor. That is, the correction amount calculated as described above becomes more accurate as a value corresponding to the error in the oxygen storage amount that is due to the response delay time of the signal of the catalyst downstream sensor as the storage cycle becomes relatively shorter with respect to the response delay time, and the number of slopes stored in the memory increases.

Accordingly, making the storage cycle relatively shorter with respect to the response delay time and increasing the number of slopes stored in the memory makes it possible to remove error due to the response delay time of the signal of the catalyst downstream sensor from the oxygen storage amount when the correction of the correction amount that is calculated based on those slopes and the like is applied to the oxygen storage amount. Also, even if the number of slopes stored in the memory is increased as described above, the number will not become too large so the necessary storage capacity of the memory will not increase excessively. This has to do with the fact that the number of the slopes stored in the memory is the number for the storage cycles covering the response delay time of the signal of the catalyst downstream sensor, and the storage cycle is a longer interval of time than the short time. If the storage cycle is so short that it is equal to the short time, the number of slopes stored in the memory will become too large, and as a result, the necessary storage capacity of the memory will inevitably increase. However, because the storage cycle is a longer interval of time than the short time, the number of slopes stored in the memory will not become too large, so the necessary storage capacity of the memory will not increase as described above.

As is evident from the description above, in the first aspect of the invention, it is possible to both remove the error due to the response delay time of the signal of the catalyst downstream sensor from the oxygen storage amount of the catalyst for determining whether the catalyst is degraded, and keep the necessary storage capacity of the memory low.

Also, the length of the storage cycle may be set such that a deviation of the calculated correction amount with respect to an appropriate value is less than an allowable level, and such that the length of the storage cycle is the maximum.

Here, the deviation of the calculated correction amount from the value (i.e., the appropriate value) corresponding to the error in the oxygen storage amount calculated by the oxygen storage amount calculating portion that is due to the response delay time of the signal of the catalyst downstream sensor decreases as the storage cycle becomes shorter and the storage cycle becomes relatively shorter with respect to the response delay time of the signal of the catalyst downstream sensor. This is because the correction amount that is calculated based on the slopes and the like stored in the memory becomes more accurate as a value corresponding to the error in the calculated oxygen storage amount that is due to the response delay time as the storage cycle becomes relatively shorter with respect to the response delay time of the signal of the catalyst downstream sensor and the number of slopes stored in the memory increases. However, when the storage cycle becomes relatively shorter with respect to the response delay time of the signal of the catalyst downstream sensor and the number of slopes stored in the memory increases, the necessary storage capacity increases.

Setting the length of the storage cycle as described above makes it possible to keep the necessary storage capacity of the memory as small as possible, while making the deviation of the calculated correction amount with respect to the appropriate value (i.e., with respect to a value corresponding to the error in the oxygen storage amount calculated by the oxygen storage amount calculating portion that is due to the response delay time of the signal of the catalyst downstream sensor) less than the allowable level.

Also, even though the response delay time of the signal of the catalyst downstream sensor with respect to a change in the oxygen concentration changes due to individual differences in the sensor and changes over time and the like, this response delay time is obtained as a value that matches the current state based on the signal that is output from the catalyst downstream sensor while the internal combustion engine is operating. Also, the storage cycle may be variably set based on the thus obtained response delay time. Therefore, the length of the storage cycle is able to be variably set such that the deviation of the calculated correction amount with respect to the appropriate value will be less than the allowable level, and such that the length of the storage cycle will be the maximum, according to the response delay time of the signal of the catalyst downstream sensor that matches the current state of this sensor.

Here, the deviation of the calculated correction amount from the value (i.e., the appropriate value) corresponding to the error in the oxygen storage amount calculated by the oxygen storage amount calculating portion that is due to the response delay time of the signal of the catalyst downstream sensor decreases as the storage cycle becomes shorter and the storage cycle becomes relatively shorter with respect to the response delay time of the signal of the catalyst downstream sensor. This is because the correction amount that is calculated based on the slopes and the like stored in the memory becomes more accurate as a value corresponding to the error in the calculated oxygen storage amount that is due to the response delay time as the storage cycle becomes relatively shorter with respect to the response delay time of the signal of the catalyst downstream sensor and the number of slopes stored in the memory increases. However, when the storage cycle becomes relatively shorter with respect to the response delay time of the signal of the catalyst downstream sensor and the number of slopes stored in the memory increases, the necessary storage capacity increases.

Setting the length of the storage cycle such that the deviation of the calculated correction amount with respect to the appropriate value will be less than the allowable level, and such that the length of the storage cycle will be the maximum, according to the response delay time of the signal of the catalyst downstream sensor that matches the current state of this sensor makes it possible to keep the necessary storage capacity of the memory as small as possible, while making the deviation of the calculated correction amount with respect to the appropriate value (i.e., with respect to a value corresponding to the error in the oxygen storage amount calculated by the oxygen storage amount calculating portion that is due to the response delay time of the signal of the catalyst downstream sensor) less than the allowable level.

Also, active air-fuel ratio control may be executed based on a preset condition. In this active air-fuel ratio control, an air-fuel ratio of the internal combustion engine may first be forced rich or lean and then the air-fuel ratio of the internal combustion engine may be reversed between rich and lean each time there is a reversal of the signal of the catalyst downstream sensor between the lean side and the rich side with respect to the value corresponding to the oxygen concentration in the exhaust gas when fuel is combusted at the stoichiometric air-fuel ratio. The oxygen storage amount may be calculated by the oxygen storage amount calculating portion from after the air-fuel ratio of the internal combustion engine reverses between rich and lean according to the active air-fuel ratio control until there is a reversal of the signal of the catalyst downstream sensor between the lean side and the rich side. Also, when there is a reversal of the signal of the catalyst downstream sensor between the lean side and the rich side, a correction of a correction amount from the correcting portion may be applied to the oxygen storage amount calculated by the oxygen storage amount calculating portion. It may be determined that the catalyst is degraded if a value (i.e., a determination oxygen storage amount) obtained by applying this correction is less than a determining value.

Here, when the active air-fuel ratio control is being executed, the oxygen storage amount calculated by the oxygen storage amount calculating portion becomes a value that corresponds to the maximum value of the oxygen storage amount of the catalyst at the end point of the period of time from after the air-fuel ratio of the internal combustion engine reverses between rich and lean until there is a reversal of the signal of the catalyst downstream sensor between the lean side and the rich side. This maximum value of the oxygen storage amount of the catalyst is a value in which a decrease thereof due to degradation of the catalyst is noticeable. Therefore, a determination that the catalyst is degraded is able to be accurate by making this determination when the determination oxygen storage amount, that is a value obtained by applying the correction of the correction amount to the oxygen storage amount calculated by the oxygen storage amount calculating portion, is less than the determining value.

Also, the determination oxygen storage amount may be obtained by applying a correction of the correction amount to the oxygen storage amount each time the oxygen storage amount is calculated by the oxygen storage amount calculating portion at a point at which the short time has passed. Accordingly, the determination oxygen storage amount for determining whether the catalyst is degraded is obtained each time the oxygen storage amount is calculated by the oxygen storage amount calculating portion, i.e., every short time. Therefore, the determination oxygen storage amount for determining whether the catalyst is degraded may also be obtained when there is a reversal of the signal of the catalyst downstream sensor between the lean side and the rich side due to the active air-fuel ratio control.

Also, it may be determined that the catalyst is degraded if the determination oxygen storage amount is less than a determining value, when there is a reversal of the signal of the catalyst downstream sensor between the lean side and the rich side. Also, a determination that the catalyst is not degraded (i.e., a determination that the catalyst is normal) may be made when the determination oxygen storage amount is equal to or greater than the determining value when there is a reversal of the signal of the catalyst downstream sensor between the lean side and the rich side, as well as while active air-fuel ratio control is being executed, even when there is no such reversal, if the determination oxygen storage amount is equal to or greater than the determining value. As a result, when the catalyst is not degraded, this determination can be made early on.

Also, when the active air-fuel ratio control is not being executed, the oxygen storage calculating portion may calculate an amount of oxygen stored in the catalyst during the short time as a positive value every short time, and calculate an amount of oxygen released from the catalyst during the short time as a negative value every short time, and a value obtained by accumulating the amounts of oxygen at each calculation may be set as the oxygen storage amount of the catalyst. A correction of the correction value may be applied by the correcting portion to the oxygen storage amount calculated in this way each time the oxygen storage amount is calculated at the point at which the short time has passed. Also, if the value after this correction (i.e., the determination oxygen storage amount) is equal to or greater than the determining value, it may be determined that the catalyst is not degraded (i.e., determined that the catalyst is normal), even if the active air-fuel ratio control is not being executed. In this way, it can be determined that the catalyst is not degraded even if the active air-fuel ratio control is not being executed, so when the catalyst is not degraded, this determination can be made even earlier.

A second aspect of the invention relates to a catalyst degradation detection method that includes calculating an amount of oxygen stored in a catalyst provided in an exhaust passage of an internal combustion engine, or an amount of oxygen released from the catalyst, during a preset short time, and calculating an oxygen storage amount of the catalyst by accumulating the amount of oxygen at each calculation, and, when there is a reversal between a lean side and a rich side with respect to a value corresponding to an oxygen concentration in exhaust gas when fuel is combusted at a stoichiometric air-fuel ratio, of a signal that is based on the oxygen concentration in the exhaust gas and output from a catalyst downstream sensor provided downstream of the catalyst in the exhaust passage, calculating a determination oxygen storage amount by applying a correction of a correction amount that corresponds to a response delay time with respect to a change in the oxygen concentration of the signal of the catalyst downstream sensor, to the calculated oxygen storage amount, and determining whether the catalyst is degraded based on the determination oxygen storage amount. The correction amount is determined by storing the calculated oxygen storage amount in memory in place of a last value as a storage value in each storage cycle that is a time interval that is longer than the short time, by calculating a slope of a change in the calculated oxygen storage amount with respect to the storage value every short time, by storing, separately in the memory, only the slopes for the number of the storage cycles covering the response delay time of the signal of the catalyst downstream sensor, from among the calculated slopes, and by calculating based on the slopes stored in the memory, the storage cycle, the response delay time, and a period of time that has passed after the end of the last storage cycle.

The second aspect of the invention makes it possible to remove error due to response delay time of a signal of a catalyst downstream sensor from an oxygen storage amount of a catalyst used for determining whether the catalyst is degraded, and keep the necessary storage capacity of memory low.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a chart showing the manner in which a correction amount is calculated when the length of a storage cycle with respect to a response delay time is set such that a number becomes 1;

FIG. 7 is a chart showing the manner in which the correction amount is calculated when the length of the storage cycle with respect to the response delay time is set such that the number becomes 2;

FIG. 8 is a chart showing the manner in which the correction amount is calculated when the length of the storage cycle with respect to the response delay time is set such that the number becomes 3;

FIG. 9 is a flowchart illustrating a catalyst degradation detection routine according to the first example embodiment;

DETAILED DESCRIPTION OF EMBODIMENTS

Hereinafter, a first example embodiment in which the invention has been applied to a vehicle engine will be described with reference to FIGS. 1 to 10.

Figure 1:
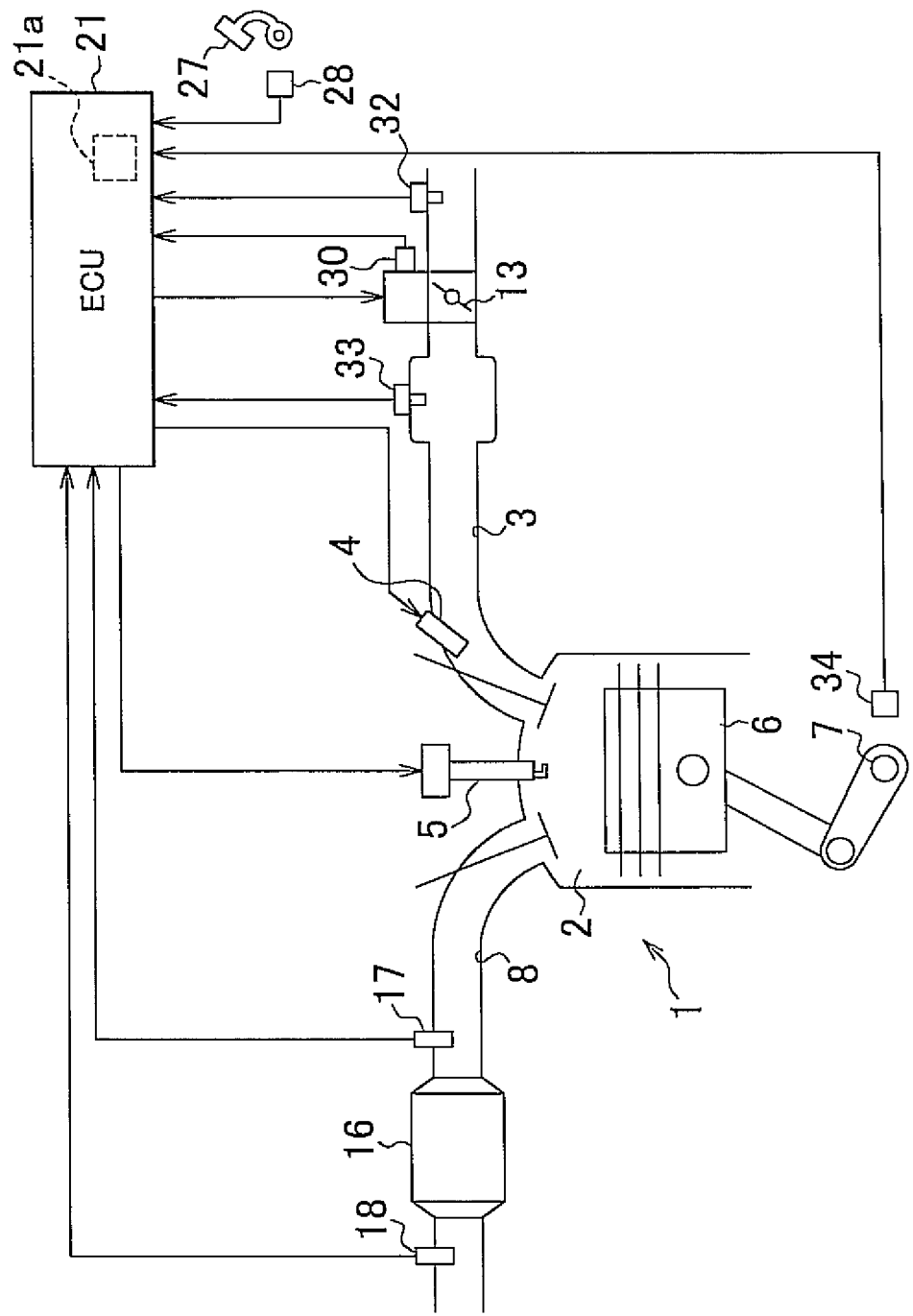
FIG. 1 is a schematic diagram of an overall engine to which a catalyst degradation detection apparatus according to a first example embodiment of the invention is applied.

In an engine 1 shown in FIG. 1, a throttle valve 13 is provided so as to be able to open and close in an intake passage 3 that is connected to a combustion chamber 2. Air is drawn into the combustion chamber 2 through the intake passage 3, and fuel that has been injected from a fuel injection valve 4 is supplied to the combustion chamber 2 via the intake passage 3. An air-fuel mixture formed from the air and fuel supplied to the combustion chamber 2 is ignited by a spark plug 5 and combusts. When the air-fuel mixture combusts in the combustion chamber 2, the resultant force that is generated causes a piston 6 to move in a reciprocating manner, and as a result, a crankshaft 7 that serves as an output shaft of the engine 1 rotates.

Meanwhile, after being combusted in the combustion chamber 2, the air-fuel mixture is discharged as exhaust gas from the combustion chamber 2 into an exhaust passage 8. The exhaust gas that passes through this exhaust passage 8 is released outside after noxious components, i.e., HC, CO, and NOx, in the exhaust gas have been purified by a three-way catalyst of a catalytic converter 16 provided in the exhaust passage 8. This three-way catalyst has an oxygen storage function for effectively removing the three components in the exhaust gas. Providing the three-way catalyst with this oxygen storage function, together with performing stoichiometric air-fuel ratio control that controls the air-fuel ratio of the air-fuel mixture to the stoichiometric air-fuel ratio such that the oxygen concentration in the catalyst atmosphere converges on a value when combustion of the air-fuel mixture at the stoichiometric air-fuel ratio is performed enables the three components, i.e., NOx, HC, and CO, in the exhaust gas to be effectively purified by the three-way catalyst.

Also, in the exhaust passage 8, an air-fuel ratio sensor 17 is provided, as a catalyst upstream sensor that outputs a signal based on the oxygen concentration in the exhaust gas, upstream of the catalytic converter 16, and an oxygen sensor 18 is provided, as a catalyst downstream sensor that outputs a signal based on the oxygen concentration in the exhaust gas, downstream of the catalytic converter 16.

Figure 2:
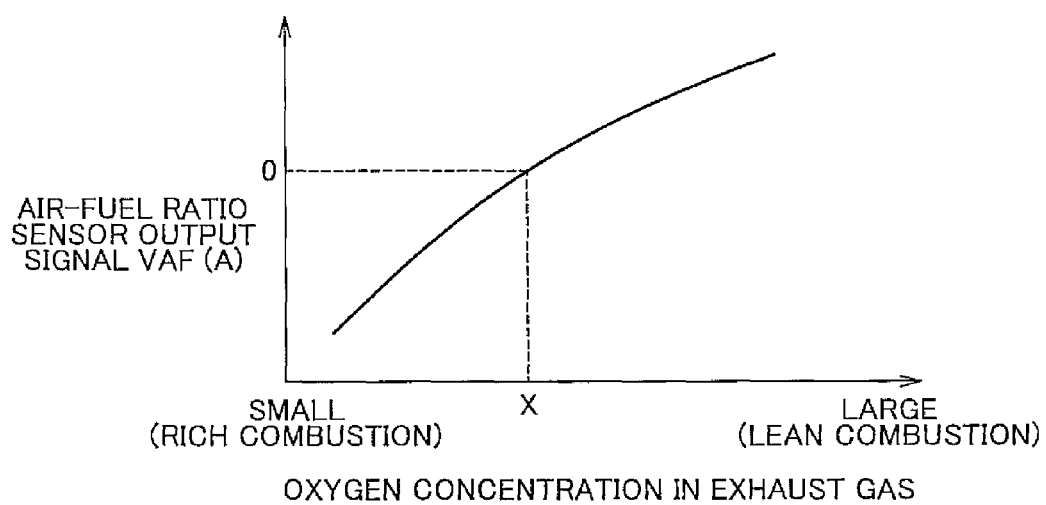
FIG. 2 is a graph showing a change in an output signal of an air-fuel ratio sensor with respect to a change in an oxygen concentration in exhaust gas.

The air-fuel ratio sensor 17 outputs a linear signal indicative of the oxygen concentration in the exhaust gas upstream of the catalyst, as shown in FIG. 2. That is, an output signal VAF of the air-fuel ratio sensor 17 becomes smaller as the oxygen concentration in the exhaust gas upstream of the catalyst decreases. When combustion of the air-fuel mixture at the stoichiometric air-fuel ratio is performed, the output signal VAF of the air-fuel ratio sensor 17 corresponds to the oxygen concentration X in the exhaust gas at that time, and is for example "0 A." Therefore, the output signal VAF of the air-fuel ratio sensor 17 becomes a value smaller than "0 A" as the oxygen concentration in the exhaust gas upstream of the catalyst decreases due to combustion of the air-fuel ratio that is richer than the stoichiometric air-fuel ratio (i.e., due to rich combustion). Also, the output signal VAF of the air-fuel ratio sensor 17 becomes a value larger than "0 A" as the oxygen concentration in the exhaust gas upstream of the catalyst increases due to combustion of the air-fuel ratio that is leaner than the stoichiometric air-fuel ratio (i.e., due to lean combustion).

Figure 3:
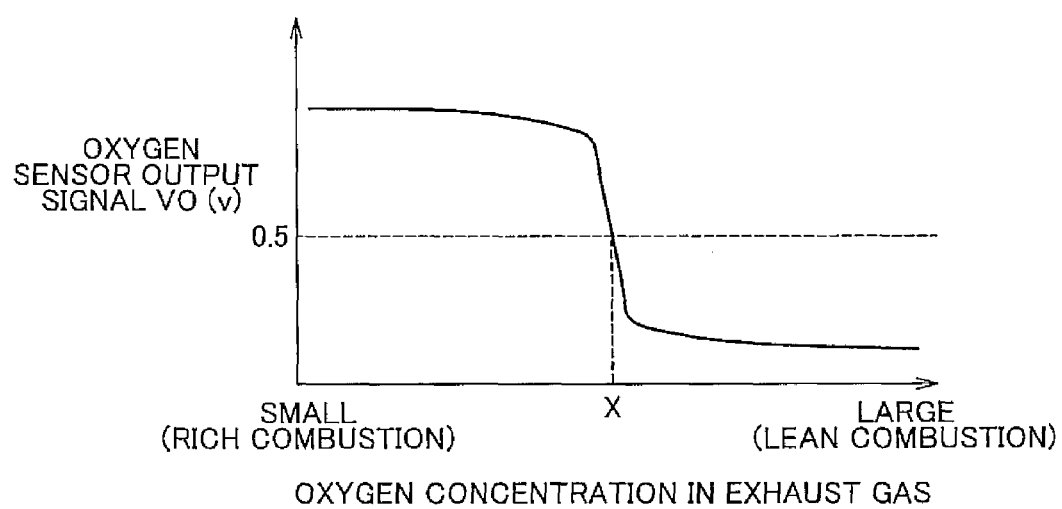
FIG. 3 is a graph showing a change in an output signal of an oxygen sensor with respect to a change in the oxygen concentration in exhaust gas.

The oxygen sensor 18 outputs a rich signal or a lean signal depending on the oxygen concentration in the exhaust gas downstream of the catalyst, as shown in FIG. 3. That is, an output signal VO of the oxygen sensor 18 outputs, for example, 0.5 v when the oxygen concentration in the exhaust gas downstream of the catalyst is the value (i.e., the oxygen concentration X) when the combustion of the air-fuel mixture at the stoichiometric air-fuel ratio is performed. Also, if the oxygen concentration in the exhaust gas downstream of the catalyst becomes greater than the oxygen concentration X due to lean combustion being performed, the oxygen sensor 18 outputs a value smaller than 0.5 v as a lean signal. When the oxygen concentration in the exhaust gas downstream of the catalyst becomes greater than the oxygen concentration X, the lean signal rapidly changes from 0.5 v to the decrease side with respect to an increase in the oxygen concentration in the vicinity of the oxygen concentration X, but gradually changes to the decrease side with respect to an increase in the oxygen concentration away from the vicinity of the oxygen concentration X.

Also, if the oxygen concentration in the exhaust gas downstream of the catalyst becomes less than the oxygen concentration X due to rich combustion being performed, a value larger than 0.5 v is output as a rich signal from the oxygen sensor 18. When the oxygen concentration in the exhaust gas downstream of the catalyst becomes less than the oxygen concentration X, the rich signal rapidly changes from 0.5 v to the increase side with respect to a decrease in the oxygen concentration in the vicinity of the oxygen concentration X, but gradually changes to the increase side with respect to a decrease in the oxygen concentration away from the vicinity of the oxygen concentration X.

Next, the electrical configuration of the catalyst degradation detection apparatus of this example embodiment will be described with reference to FIG. 1. This air-fuel ratio control apparatus includes an electronic control unit (ECU) 21 that executes various controls related to the engine 1. The ECU 21 includes a CPU that executes various calculation processes related to the controls, ROM in which programs and data necessary for the controls are stored, RAM in which the calculation results and the like of the CPU are temporarily stored, and input/output ports for inputting and outputting signals from/to external equipment, and the like.

Various sensors and the like that will be described below, in addition to the air-fuel ratio sensor 17 and the oxygen sensor 18 described above, are connected to the input port of the ECU 21. One of these sensors is an accelerator position sensor 28 that detects a depression amount (i.e., an accelerator depression amount) of an accelerator pedal 27 depressed (i.e., operated) by a driver of the vehicle.

Also, a throttle position sensor 30 that detects an opening amount (i.e., a throttle opening amount) of the throttle valve 13 provided in the intake passage 3, and an airflow meter 32 that detects the amount of air that is drawn into the combustion chamber 2 through the intake passage 3, are connected to the input port of the ECU 21.

Also, an intake air pressure sensor 33 that detects the pressure (i.e., the intake air pressure) downstream of the throttle valve 13 in the intake passage 3, and a crank position sensor 34 that outputs a signal corresponding to the rotation of the crankshaft 7 and is used for calculating the engine speed and the like are connected to the input port of the ECU 21.

Various drive circuits of the fuel injection valve 4, the spark plug 5, and the throttle valve 13 and the like are connected to the output port of the ECU 21. The ECU 21 ascertains the engine operating state, such as the engine speed and the engine load (i.e., the amount of air drawn into the combustion chamber 2 for every one cycle of the engine 1), based on the detection signals input from the various sensors. The engine speed is obtained based on the detection signal from the crank position sensor 34. Also, the engine load is calculated from the engine speed and the intake air amount of the engine 1 that is obtained based on the detection signals from the accelerator position sensor 28, the throttle position sensor 30, and the airflow meter 32, and the like. The ECU 21 outputs a command signal to various drive circuits that are connected to the output port, according to the engine operating state, such as the engine load and the engine speed. In this way, the ECU 21 executes various controls of the engine 1, such as fuel injection quantity control, ignition timing control, and intake air amount control.

The stoichiometric air-fuel ratio control to effectively purify the exhaust gas of the engine 1 using the three-way catalyst of the catalytic converter 16 is realized by adjusting the fuel injection quantity based on the output signal VAF of the air-fuel ratio sensor 17 and the output signal VO from the oxygen sensor 18. More specifically, the fuel injection quantity of the engine 1 is increased or decreased based on the output signal VAF of the air-fuel ratio sensor 17 such that the output signal VAF comes to match a value when the air-fuel mixture in the combustion chamber 2 of the engine 1 is combusted at the stoichiometric air-fuel ratio (i.e., "0 A" in this example). Accordingly, the air-fuel ratio of the air-fuel mixture in the combustion chamber 2 of the engine 1 is controlled to converge on the stoichiometric air-fuel ratio while fluctuating between rich and lean. However, with only the adjustment of the fuel injection quantity according to the output signal VAF of the air-fuel ratio sensor 17, the center of fluctuation of the air-fuel ratio of the engine 1 that fluctuates between rich and lean to converge on the stoichiometric as described above may be off from the stoichiometric air-fuel ratio due to product variation of the sensor or the like. In order to correct this offset, the fuel injection quantity of the engine 1 is also adjusted according to the signal output from the oxygen sensor 18, such that the center of fluctuation of the air-fuel ratio of the engine 1 that fluctuates between rich and lean as a result of adjusting the fuel injection quantity according to the output signal VAF from the air-fuel ratio sensor 17 comes to match the stoichiometric air-fuel ratio.

Next, an outline of the determination of whether the catalyst is degraded that is performed on the three-way catalyst of the catalytic converter 16 in this example embodiment will be described. The determination of whether the three-way catalyst is degraded is made using the fact that the oxygen storage function of the catalyst decreases as the catalyst degrades. That is, the maximum value of the oxygen storage amount of the catalyst that corresponds to the oxygen storage function of the three-way catalyst is obtained and it is determined whether the catalyst is degraded based on this obtained maximum value of the oxygen storage amount.

When obtaining the maximum value of the oxygen storage amount, active air-fuel ratio control that forcibly switches the air-fuel ratio of the air-fuel mixture in the combustion chamber 2 of the engine 1 between rich and lean every predetermined timing is performed. This active air-fuel ratio control starts to be executed when all of various conditions are satisfied. These conditions are i) that the determination of whether the three-way catalyst is degraded have not been completed even once after the startup of the engine 1 has started, ii) that the engine 1 be operating steadily within a preset degradation determining engine operating range, and iii) that the temperature of the three-way catalyst be in an active temperature range. Also, if even one of these execution conditions ceases to be satisfied or if the various values for which the control is executed has finished being calculated or measured while the active air-fuel ratio control is being executed, the control will stop being executed.

Figure 4A:
FIGS. 4A to 4E are time charts showing a change in an air-fuel ratio of the engine during active air-fuel ratio control, a change in the output signal of the air-fuel ratio sensor, a change in the obtained oxygen storage amount, a change in the oxygen concentration around the oxygen sensor, and a change in the output signal of the oxygen sensor.
Figure 4B:
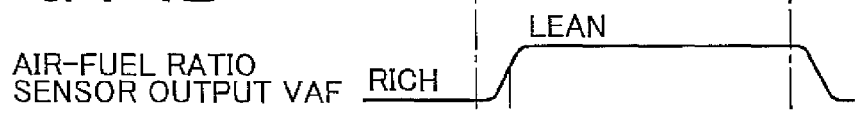

In the active air-fuel ratio control, when the air-fuel ratio of the engine 1 is forcibly switched from rich to lean at timing t1 in FIG. 4A, for example, the output signal VAF of the air-fuel ratio sensor 17 increases as shown in FIG. 4B in response to this change. Timing t2 in FIG. 4B is a timing at which the output signal VAF of the air-fuel ratio sensor 17 becomes a value corresponding to the oxygen concentration in the exhaust gas when the air-fuel mixture in the combustion chamber 2 is combusted at the stoichiometric air-fuel ratio. From timing t2 in the drawing, exhaust gas with a large oxygen concentration passes through the three-way catalyst in response to the change in the air-fuel ratio to the lean side. However, oxygen in the exhaust gas is stored in the three-way catalyst, so while this oxygen is being stored, the oxygen concentration in the exhaust gas downstream of the catalyst is still small. Therefore, the output signal VO of the oxygen sensor 18 does not change in response to the air-fuel ratio changing to the lean side, as shown in FIG. 4E. Then when the three-way catalyst is no longer able to store any more oxygen such that exhaust gas with a large oxygen concentration starts to flow downstream of the catalyst, the output signal VO of the oxygen sensor 18 changes in response to the air-fuel ratio changing to the lean side.

The determination that the output signal VO of the oxygen sensor 18 has changed in response to the air-fuel ratio changing to the lean side, i.e., the determination that there has been a reversal of the output signal VO from the rich side to the lean side, may be made based on the fact that the output signal VO has reached a lean determining value HL that is used for making this determination. When the output signal VO reaches the lean determining value HL (t4) as described above, and it is determined that there has been a reversal of the output signal VO from the rich side to the lean side based on this fact, the air-fuel ratio of the engine 1 is forcibly switched from lean to rich.

The total value (i.e., the oxygen storage amount OSA) of the amount of oxygen stored in the catalyst, during a period (t2 to t4) from when there is a change in the air-fuel ratio from rich to lean in the output signal VAF of the air-fuel ratio sensor 17 until the output signal VO of the oxygen sensor 18 changes (reverses from rich to lean) in response to that change in the air-fuel ratio, represents the maximum value of the amount of oxygen stored in the three-way catalyst. This oxygen storage amount OSA is obtained as described below during this period (i.e., t2 to t4). That is, the oxygen amount $\Delta OSA$ is calculated every short time $\Delta t$ based on Expression (1) below, as the amount of oxygen stored in the three-way catalyst in the short time $\Delta t$ during this period (i.e., t2 to t4).

$$\Delta OSA = (\Delta A/F) \times Q \times K \quad (1)$$

$\Delta OSA$: the oxygen storage amount every short time
$\Delta A/F$: the air-fuel ratio difference
$Q$: the injection fuel quantity
$K$: an oxygen percentage The air-fuel ratio difference $\Delta A/F$ in Expression (1) above represents the absolute value of the difference of the air-fuel ratio obtained from the output signal VAF of the air-fuel ratio sensor 17 minus the stoichiometric air-fuel ratio. Also, the fuel injection quantity Q in Expression (1) represents the fuel injection quantity of the engine 1 that causes the air-fuel ratio obtained based on the output signal VAF of the air-fuel ratio sensor 17, i.e., the amount of fuel injected from the fuel injection valve 4. Further, the percentage of oxygen K in Expression (1) represents the percentage of oxygen in the air. Here, a fixed value of 0.23, for example, is used as the oxygen percentage K. The oxygen amount $\Delta OSA$ calculated every short time $\Delta t$ based on Expression (1) above is integrated (accumulated) every short time $\Delta t$ over the period (i.e., t2 to t4). Also, the value obtained through this integration serves as the oxygen storage amount OSA of the three-way catalyst at that time. Therefore, the oxygen storage amount OSA obtained by this integration at the end of the period (t2 to t4) is the current maximum value of the amount of oxygen able to be stored in the three-way catalyst.

Figure 4C:
Figure 4D:
Figure 4E:
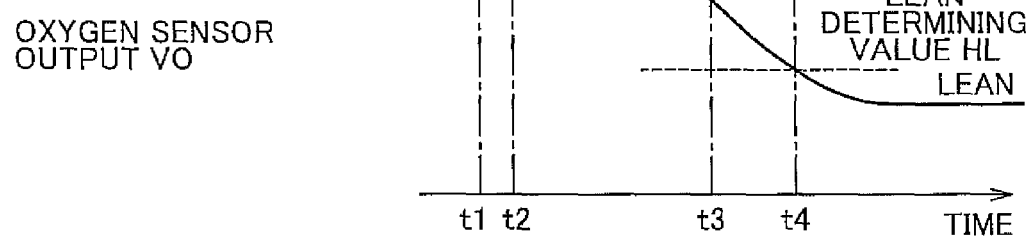
Figure 5A:
FIGS. 5A to 5E are time charts showing a change in the air-fuel ratio of the engine during active air-fuel ratio control, a change in the output signal of the air-fuel ratio sensor, a change in the obtained oxygen release amount, a change in the oxygen concentration around the oxygen sensor, and a change in the output signal of the oxygen sensor.
Figure 5B:
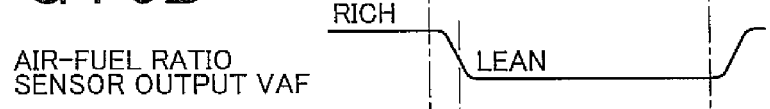

In the active air-fuel ratio control, when the air-fuel ratio of the engine 1 is forcibly switched from lean to rich at timing t5 in FIG. 5A, for example, the output signal VAF of the air-fuel ratio sensor 17 decreases as shown in FIG. 5B in response to this change. Timing t6 in FIG. 5B is a timing at which the output signal VAF of the air-fuel ratio sensor 17 becomes a value corresponding to the oxygen concentration in the exhaust gas when the air-fuel mixture in the combustion chamber 2 is combusted at the stoichiometric air-fuel ratio. This switch in the air-fuel ratio of the engine 1 from lean to rich is performed at the time (t4 in FIG. 4) when the output signal VO of the oxygen sensor 18 reaches the lean determining value HL as described above, for example. From timing t5 in the drawing, exhaust gas with a small oxygen concentration passes through the three-way catalyst in response to the change in the air-fuel ratio to the rich side. However, oxygen that has been stored in the three-way catalyst is released into the exhaust gas, so while this oxygen is being released from the catalyst, the oxygen concentration in the exhaust gas downstream of the catalyst is still large. Therefore, the output signal VO of the oxygen sensor 18 does not change in response to the air-fuel ratio changing to the rich side, as shown in FIG. 5E. Then when all of the oxygen that had been stored in the three-way catalyst is spent such that no more oxygen can be released into the exhaust gas, and as a result, exhaust gas with a small oxygen concentration flows downstream of the catalyst, the output signal VO of the oxygen sensor 18 changes in response to the air-fuel ratio changing to the rich side. The determination that the output signal VO of the oxygen sensor 18 has changed in response to the air-fuel ratio changing to the rich side, i.e., the determination that there has been a reversal of the output signal VO from the lean side to the rich side, may be made based on the fact that the output signal VO has reached a rich determining value HR that is used for making this determination. When the output signal VO reaches the rich determining value HR (t8) as described above, and it is determined that there has been a reversal of the output signal VO from the lean side to the rich side based on this fact, the air-fuel ratio of the engine 1 is forcibly switched from rich to lean.

The total value (i.e., the oxygen storage amount OSA) of the amount of oxygen released from the catalyst represents the maximum value of the amount of oxygen that is stored in the three-way catalyst during a period (t6 to t8) from when there is a change of the air-fuel ratio from lean to rich in the output signal VAF of the air-fuel ratio sensor 17 until the output signal VO of the oxygen sensor 18 changes in response to that change in the air-fuel ratio. This oxygen storage amount OSA is obtained during this period (i.e., t6 to t8) using the same method as is used during the period (t2 to t4) in FIG. 4. That is, the oxygen amount ΔOSA is calculated every short time Δt based on Expression (1) above, as the amount of oxygen released from the three-way catalyst in the short time Δt during this period (i.e., t6 to t8). Furthermore, the oxygen amount ΔOSA calculated every short time Δt based on Expression (1) is integrated (accumulated) over the period (i.e., t6 to t8). Also, the value obtained through this integration is obtained as the total value (i.e., the oxygen storage amount OSA) of the amount of oxygen released from the three-way catalyst up until this point. Therefore, the oxygen storage amount OSA obtained by this integration at the end of the period (t6 to t8) is the current maximum value of the amount of oxygen that can be stored in the three-way catalyst.

The active air-fuel ratio control ends after the oxygen storage amount OSA that is necessary to determine whether the three-way catalyst is degraded is obtained. In this active air-fuel ratio control, when the output signal VO of the oxygen sensor 18 reverses between the lean side and the rich side after the air-fuel ratio of the engine 1 is forced rich or lean, the oxygen storage amount OSA calculated at this time is the current maximum value of the oxygen storage amount of the catalyst as described above. Therefore, the determination of whether the catalyst is degraded may be made based on the oxygen storage amount OSA calculated at the time that the output signal VO of the oxygen sensor 18 reverses between the lean side and the rich side. For example, if the oxygen storage amount OSA is equal to or greater than a preset determining value, it is determined that the catalyst is not degraded (i.e., that the catalyst is normal), but if the oxygen storage amount OSA is less than the preset determining value, it is determined that the catalyst is degraded.

However, the oxygen storage amount OSA used in the determination of whether the catalyst is degraded is a value that includes error due to a response delay time Tr that occurs in the output signal VO of the oxygen sensor 18, so the oxygen storage amount OSA is a value that is off from the true value of the current maximum value of the oxygen storage amount of the catalyst by the amount of this error. When the response delay time Tr of the output signal VO of the oxygen sensor 18 is applied to the examples in FIGS. 4D, 4E, 5D, and 5E, the response delay time Tr of the output signal VO of the oxygen sensor 18 is the time indicated by the arrow in FIGS. 4D, 4E, 5D, and 5E. That is, the response delay time Tr (i.e., the arrow in the drawings) is the time (t3 to t4 and t7 to t8) that it takes, from the time that the oxygen concentration of the exhaust gas around the oxygen sensor 18 (i.e., the oxygen concentration downstream of the catalyst) changes as shown in FIGS. 4D and 5D, for the output signal VO of the oxygen sensor 18 to change to a value corresponding to the oxygen concentration after that change, as shown in FIGS. 4E and 5E.

Figure 5C:
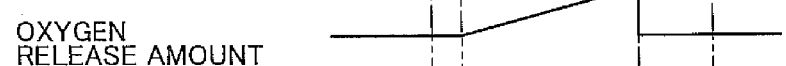
Figure 5D:
Figure 5E:
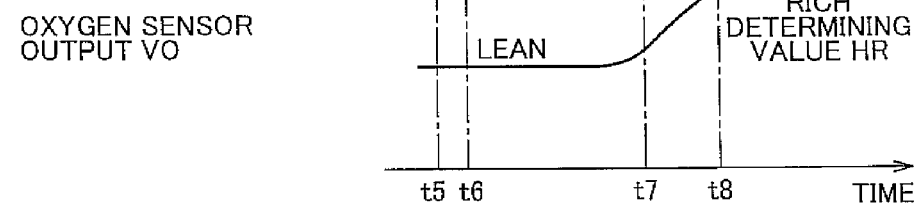

Because of this response delay time Tr, the oxygen storage amount OSA used to determine whether the catalyst is degraded includes error due to the response delay time Tr that is indicated by the alternate long and short dashes line in FIGS. 4C and 5C. This error causes the oxygen storage amount OSA to be a value that is off from the true value of the current maximum value of the oxygen storage amount of the catalyst. If the oxygen storage amount OSA is a value that is off from the true value of the current maximum value of the oxygen storage amount of the catalyst, the determination of whether the catalyst is degraded that is based on this oxygen storage amount OSA may be inaccurate.

Next, the determination of whether the catalyst is degraded according to this example embodiment that aims to solve this kind of problem will be described in detail. In this example embodiment, when determining whether the catalyst is degraded based on the oxygen storage amount OSA, a correction of a correction amount H corresponding to the response delay time Tr with respect to the change in the oxygen concentration of the output signal VO of the oxygen sensor 18 is applied to this oxygen storage amount OSA. Then it is determined whether the catalyst is degraded based on a determination oxygen storage amount OSC that is the oxygen storage amount OSA after this correction. The correction amount H used when obtaining this determination oxygen storage amount OSC is calculated according to steps [1] to [4] below while active air-fuel ratio control is being executed.

[1] The oxygen storage amount OSA calculated by accumulating the oxygen amount ΔOSA every short time Δt is stored in memory 21a (FIG. 1) of the ECU 21 in place of the last value as an OSA storage value in each storage cycle T that is a longer time interval than the short time Δt.

[2] A slope θn of a change in the oxygen storage amount OSA calculated every short time Δt with respect to the OSA storage value is calculated every short time Δt.

[3] The slope θn calculated every short time Δt is stored in the memory 21a of the ECU 21 in each storage cycle T. More specifically, from among the slopes θn calculated every short time Δt, only the slopes (n=1 to k) for the number (such as k) of the storage cycles covering the response delay time Tr are stored separately in the memory 21a. Thus, the oldest slope θn (θk) is erased when the most recent slope θn (θ1) is stored in the memory 21a.

[4] The correction amount H is calculated based on various parameters, i.e., the slope θn stored in the memory 21a, the storage cycle T, the response delay time Tr, and an elapsed time ΣΔt from the end of the last storage cycle T. In this example embodiment, a preset fixed value is used as the storage cycle T. Also, a reference value obtained through testing or the like beforehand is used as the response delay time Tr.

Here, in step [3] above, the number (=k) of slopes θn stored in the memory 21a, i.e., the number (=k) of slopes θn used to calculate the correction amount H in step [4] above, changes according to the relative length of the storage cycle T with respect to the response delay time Tr.

FIG. 6 is a chart showing the manner in which the correction amount H is calculated when the length of the storage cycle T with respect to the response delay time Tr is set such that the number k becomes 1. The solid line in the drawing represents the shift over time in the oxygen storage amount OSA that is the accumulation of the oxygen amount ΔOSA every short time Δt, while active air-fuel ratio control is executed. If the output signal VO of the oxygen sensor 18 reverses between the rich side and the lean side at the point (timing ×2) at which the elapsed time ΣΔt from the end (timing ×1) of the last storage cycle T in the drawing has elapsed, it is determined whether the catalyst is degraded at that point.

However, the oxygen storage amount OSA (indicated by the solid line) calculated every short time Δt that point (×2) includes error of an amount corresponding to the response delay time Tr of the output signal VO of the oxygen sensor 18. Therefore, the oxygen storage amount from which this error has been removed (i.e., the determination oxygen storage amount OSC) is obtained by calculating the correction amount H corresponding to this error and applying a correction of this correction amount H to the oxygen storage amount OSA at timing ×2, or more specifically, by subtracting the correction amount H from the oxygen storage amount OSA. Then it is determined whether the catalyst is degraded based on this determination oxygen storage amount OSC.

The correction amount H is calculated based on Expression (2) below.

$$H = \text{slope } \theta n \times \text{elapsed time } \Sigma \Delta t + \text{slope } \theta 1 \times (\text{response delay time } Tr - \text{elapsed time } \Sigma \Delta t) \quad (2)$$

In Expression (2), the slope θn is a value calculated in step [2] above closest to the timing ×2, and the slope θ1 is a value stored in the memory 21a in step [3] above at timing ×1. The correction amount H calculated in this way may be a value that deviates by a deviation amount a, for example, from an appropriate value as a value corresponding to the error. This is because the shift in the oxygen storage amount OSA before timing ×1 is not necessarily limited to being a linear shift that corresponds to the slope θ1 such as that shown by the broken line in the drawing. Rather, it is highly likely that the shift in the oxygen storage amount OSA before timing ×1 will be a non-linear shift such as that shown by the solid line. If the shift in the oxygen storage amount OSA before timing ×1 is a non-linear shift in this way, the correction amount H calculated according to Expression (2) will deviate by the deviation amount a in the drawing from the appropriate value.

FIG. 7 is a chart showing the manner in which the correction amount H is calculated when the length of the storage cycle T with respect to the response delay time Tr is set such that the number k becomes 2. The solid line in the drawing also represents the shift over time in the oxygen storage amount OSA that is the accumulation of the oxygen amount ΔOSA every short time Δt, while active air-fuel ratio control is executed. If the output signal VO of the oxygen sensor 18 reverses between the rich side and the lean side at the point (timing ×5) at which the elapsed time ΣΔt from the end (timing ×4) of the last storage cycle T in the drawing has elapsed, it is determined whether the catalyst is degraded at that point.

In this case, in order to remove error of an amount corresponding to the response delay time Tr of the output signal VO of the oxygen sensor 18 from the oxygen storage amount OSA (indicated by the solid line) calculated every short time Δt timing ×5, the correction amount H corresponding to this error is calculated, and a correction of this correction amount H is applied to the oxygen storage amount OSA. More specifically, the oxygen storage amount from which this error has been removed (i.e., the determination oxygen storage amount OSC) is obtained by subtracting the correction amount H from the oxygen storage amount OSA. Then it is determined whether the catalyst is degraded based on this determination oxygen storage amount OSC.

The correction amount H is calculated based on Expression (3) below.

$$H = \text{slope } \theta n \times \text{elapsed time } \Sigma \Delta t + \text{slope } \theta 1 \times \text{storage cycle } T + \text{slope } \theta 2 \times (\text{response delay time } Tr - \text{storage cycle } T - \text{elapsed time } \Sigma \Delta t) \quad (3)$$

In Expression (3), the slope θn is a value calculated in step [2] above closest to the timing ×5, and the slopes θ1 and θ2 are values stored in the memory 21a in step [3] above at timings ×3 and ×4. The correction amount H calculated in this way may be a value that deviates by a deviation amount b, for example, from an appropriate value as a value corresponding to the error for the same reason shown in FIG. 6. That is, the shift in the oxygen storage amount OSA before timing ×3 will be a non-linear shift, so the correction amount H calculated according to Expression (3) will deviate by the deviation amount b (<a) in the drawing from the appropriate value.

FIG. 8 is a chart showing the manner in which the correction amount H is calculated when the length of the storage cycle T with respect to the response delay time Tr is set such that the number k becomes 3. The solid line in the drawing also represents the shift over time in the oxygen storage amount OSA in which the oxygen amount ΔOSA is accumulated every short time Δt, while active air-fuel ratio control is executed. Also, when the output signal VO of the oxygen sensor 18 reverses between the rich side and the lean side at the point (timing ×9) at which the elapsed time ΣΔt from the end (timing ×8) of the last storage cycle T in the drawing has elapsed, it is determined whether the catalyst is degraded at that point.

In this case, in order to remove error of an amount corresponding to the response delay time Tr of the output signal VO of the oxygen sensor 18 from the oxygen storage amount OSA (indicated by the solid line) calculated every short time Δt timing ×9, the correction amount H corresponding to this error is calculated, and a correction of this correction amount H is applied to the oxygen storage amount OSA. More specifically, the oxygen storage amount from which this error has been removed (i.e., the determination oxygen storage amount OSC) is obtained by subtracting the correction amount H from the oxygen storage amount OSA. Then it is determined whether the catalyst is degraded based on this determination oxygen storage amount OSC.

The correction amount H is calculated based on Expression (4) below.

$$H = \text{slope } \theta n \times \text{elapsed time } \Sigma \Delta t + \text{slope } \theta 1 \times \text{storage cycle } T_{+slope} \theta 2 \times \text{storage cycle } T + \text{slope } \theta 3 \times (\text{response delay time } Tr - \text{storage cycle } T \times 2 - \text{elapsed time } \Sigma \Delta t) \quad (4)$$

In Expression (4), the slope θn is a value calculated in step [2] above closest to the timing ×9, and the slopes θ1, θ2, and θ3 are values stored in the memory 21a in step [3] above at timings ×6, ×7, and ×8. The correction amount H calculated in this way may be a value that deviates by a deviation amount c, for example, from an appropriate value as a value corresponding to the error for the same reason shown in FIGS. 6 and 7. That is, the shift in the oxygen storage amount OSA before timing ×6 will be a non-linear shift, so the correction amount H calculated according to Expression (4) will deviate by the deviation amount c (<b<a) in the drawing from the appropriate value.

Expressions (2) to (4) for calculating the correction amount H can be written as Expression (5) below using the number k.

Correction amount $H = \text{slope } \theta n \times \text{elapsed time } \Sigma \Delta t + \{\text{slope } \theta 1 + \ldots + \text{slope } \theta (k-1)\} \times \text{storage cycle}$ $$T + \text{slope } \theta k \times \{\text{response delay time } Tr - \text{storage cycle } T \times (k-1) - \text{elapsed time } \Sigma \Delta t\} \quad (5)$$

It should be noted that the storage cycle T in this example embodiment is set to the maximum length at which the deviation of the correction amount H with respect to the appropriate value can be made less than the allowable level. Here, the deviation of the correction amount H from the appropriate value tends to become smaller as the storage cycle T is shortened and the storage cycle T becomes relatively shorter with respect to the response delay time Tr. This is because the correction amount H calculated based on the slope θ1, . . . θk and the like becomes more accurate as a value corresponding to the error in the oxygen storage amount OSA that is due to the response delay time Tr as the storage cycle T becomes relatively shorter with respect to the response delay time Tr, and the number of slopes θ1, . . . θk stored in the memory 21a increases. However, when the storage cycle T becomes relatively shorter with respect to the response delay time Tr of the output signal VO of the oxygen sensor 18 and the number of slopes θ1, . . . θk stored in the memory 21a increases, the necessary storage capacity increases.

Regarding this point, setting the length of the storage cycle T as described above, i.e., setting the storage cycle T to the maximum length at which the deviation of the correction amount H with respect to the appropriate value is able to be made less than the allowable limit, enables the necessary storage capacity of the memory to be kept as small as possible while the deviation of the correction amount H with respect to the appropriate value is made less than the allowable level. A storage cycle T in which the number k becomes 7, for example, is a specific example of a storage cycle T that enables this to be realized. Also, in this example embodiment, steps [3] and [4] described above are executed while the number k is 7.

Next, a specific routine for determining whether the catalyst is degraded will be described with reference to the flowchart in FIG. 9 that illustrates a degradation detection routine. This catalyst degradation detection routine is executed by the ECU 21 in cycles by interrupting every short time Δt.

In this routine, if the active air-fuel ratio control is being executed (i.e., YES in step S101), the oxygen amount ΔOSA is calculated using Expression (1) above (S102). Then, the oxygen storage amount OSA is obtained by accumulating the oxygen amount ΔOSA at each calculation (i.e., every short time Δt).

If there is a reversal between the rich side and the lean side of the output signal VO of the oxygen sensor 18 while the active air-fuel ratio control in which the oxygen storage amount OSA is calculated in this way is being executed (i.e., YES in step S104), and this reversal is the first reversal during the current execution of the active air-fuel ratio control (i.e., NO in step S105), the oxygen storage amount OSA is initialized (S110). That is, the oxygen storage amount OSA is set to 0. If, on the other hand, the reversal is not the first reversal during the current execution of the active air-fuel ratio control (i.e., YES in step S105), a correction of the correction amount H is applied to the oxygen storage amount OSA, such that a determination oxygen storage amount OSC for use in determining whether the catalyst is degraded is obtained (S106). More specifically, the value obtained by subtracting the correction amount H from the oxygen storage amount OSA serves as the determination oxygen storage amount OSC.

If the determination in step S105 is yes, i.e., if the reversal of the output signal VO of the oxygen sensor 18 is the second or subsequent reversal while the active air-fuel ratio control is being executed, it is determined whether the catalyst is degraded based on the determination oxygen storage amount OSC. More specifically, it is determined whether the determination oxygen storage amount OSC is less than a preset determining value (S107). If the determination here is yes, it is determined that the catalyst is degraded (S108). If, on the other hand, it is determined that the determination oxygen storage amount OSC is equal to or greater than the determining value, it is determined that the catalyst is not degraded (i.e., that the catalyst is normal) (S109). After the determination of whether the catalyst is degraded is made in this way, the oxygen storage amount OSA is set to 0 through an oxygen storage amount OSA initialization process in step S110.

Figure 10:
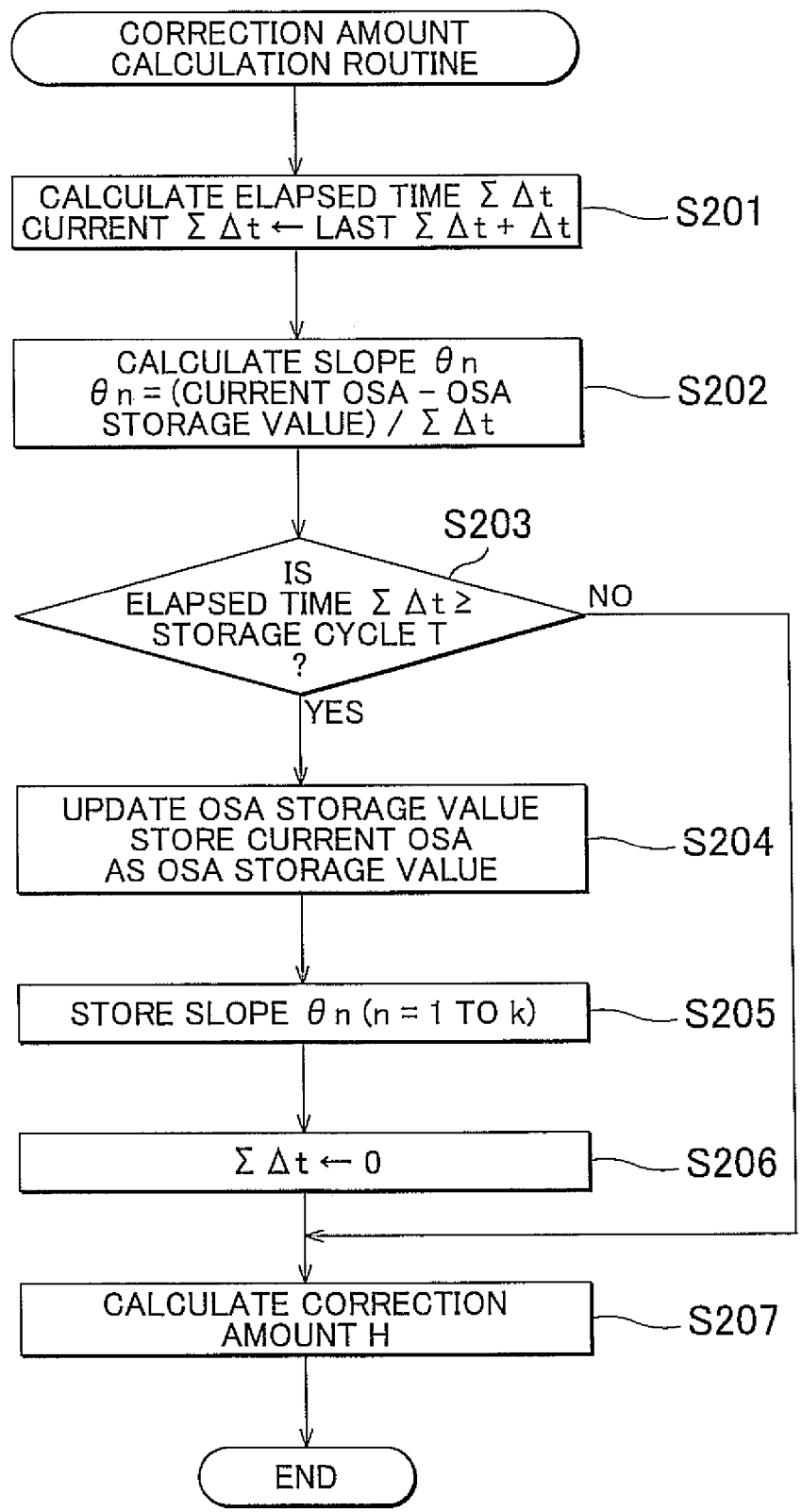
FIG. 10 is a flowchart illustrating a routine for calculating a correction amount for correcting the oxygen storage amount.

The correction amount H used to obtain the determination oxygen storage amount OSC in step S106 is calculated by a correction amount calculation routine shown in FIG. 10. This correction amount calculation routine is also executed by the ECU 21 in cycles by interrupting every short time Δt while the active air-fuel ratio control is being executed.

In this routine, step S202 corresponds to step [2] described above for calculating the correction amount H, steps S203 and S204 correspond to step [1] described above for calculating the correction amount H, steps S203 and S205 correspond to step [3] described above for calculating the correction amount H, and step S207 corresponds to step [4] described above for calculating the correction amount H.

In this routine, first, the elapsed time ΣΔt at the current time is calculated by accumulating the short times Δt (S201). Next, the calculation of the slope θn in step [2] is performed (S202) using the elapsed time ΣΔt, the OSA storage value stored in the memory 21a in step S204 that will be described later, and the oxygen storage amount OSA calculated every short time Δt in step S103 of the degradation detection routine (FIG. 9). More specifically, the slope θn of the change in the current oxygen storage amount OSA with respect to the OSA storage value is calculated using the expression θn=(oxygen storage amount OSA−OSA storage value)/elapsed time ΣΔt.

In step S203 performed as part of steps [1] and [3], it is determined whether the current elapsed time ΣΔt is equal to or greater than the storage cycle T. If the determination here is yes, then the current oxygen storage amount OSA is stored in the memory 21a in place of the last value as the OSA storage value, thus updating the OSA storage value stored in the memory 21a (S204). Next, the slope θn calculated in step S202 is stored in the memory 21a (S205). Through these steps S203 to S205, from among the oxygen storage amounts OSA calculated every short time Δt in step [1] described above current oxygen storage amount OSA is stored (i.e., updated) as the OSA storage value that is stored every storage cycle T, and from among the slopes θn calculated every short time Δt in step [3], the slopes for k number corresponding to the storage cycles are stored. Then when these are stored, the elapsed time ΣΔt is reset to 0 (S206).

Also, in step S207, the calculation of the correction amount H in step [4] is performed. That is, the correction amount H is calculated using Expression (5) based on various parameters, i.e., the slope θn stored in the memory 21a, the storage cycle T, the response delay time Tr, and the elapsed time ΣΔt. In this example embodiment, 7 is used as the number k that is used in Expression (5), as described above. The purpose of this is to set the storage cycle T such that the deviation of the correction amount H calculated using Expression (5) with respect to the appropriate value becomes less than the allowable level, and the storage cycle T becomes the maximum length.

The example embodiment described in detail above is able to yield the effects described below. (1) The determination oxygen storage amount OSC used to determine whether the catalyst is degraded is obtained by applying a correction of the correction amount H for removing the error due to the response delay time Tr of the output signal VO of the oxygen sensor 18 from the oxygen storage amount OSA to the oxygen storage amount OSA. The correction amount H is calculated by steps [1] to [4] described above. Also, as is evident from step [4], the slopes θn (n=1 to k) stored in the memory 21a, i.e., the slopes θn (n=1 to k) for the number (k) of the storage cycles covering the response delay time Tr of the output signal VO of the oxygen sensor 18, is included in the parameters used to calculate the correction amount H. Therefore, regardless of whether the oxygen storage amount OSA calculated every short time Δt shifts in a linear manner or a non-linear manner over time, it is possible to make the correction amount H calculated based on the slope θn (n=1 to k) and the like a value corresponding to the error in the oxygen storage amount OSA that is due to the response delay time Tr. That is, the correction amount H calculated as described above becomes more accurate as a value corresponding to the error in the oxygen storage amount OSA that is due to the response delay time Tr as the storage cycle T becomes relatively shorter with respect to the response delay time Tr, and the number k of slopes θn stored in the memory 21a increases.

Accordingly, making the storage cycle T relatively shorter with respect to the response delay time Tr and increasing the number k of slopes θn stored in the memory 21a makes it possible to remove error due to the response delay time Tr from the oxygen storage amount (i.e., the determination oxygen storage amount OSC) when the correction of the correction amount H that is calculated based on those slopes θn and the like is applied to the oxygen storage amount OSA. Also, even if the number k of slopes θn stored in the memory 21a is increased as described above, the number k will not become too large so the necessary storage capacity of the memory 21a will not increase excessively. This has to do with the fact that the number k of the slopes θn stored in the memory 21a is the number of the storage cycles covering the response delay time Tr, and the storage cycle T is a longer interval of time than the short time Δt. If the storage cycle T is so short that it is equal to the short time Δt, the number k of slopes θn stored in the memory 21a will become too large, and as a result, the necessary storage capacity of the memory 21a will inevitably increase to approximately the same amount as when the buffer method described in the related art section above is used. However, because the storage cycle T is a longer interval of time than the short time Δt, the number k of slopes θn stored in the memory 21a will not become too large, so the necessary storage capacity of the memory 21a will not increase as described above.

Therefore, it is possible to both remove the error due to the response delay time Tr of the output signal VO of the oxygen sensor 18 from the oxygen storage amount (i.e., the determination oxygen storage amount OSC) of the catalyst for determining whether the catalyst is degraded, and keep the necessary storage capacity of the memory 21a low.

(2) The deviation of the correction amount H from the value (i.e., the appropriate value) corresponding to the error in the oxygen storage amount OSA that is due to the response delay time Tr tends to decrease as the storage cycle T becomes shorter and the storage cycle T becomes relatively shorter with respect to the response delay time Tr. However, if the storage cycle T is made relatively shorter with respect to the response delay time Tr, the number of slopes θ1, . . . θk stored in the memory 21a will increase, so the necessary storage capacity of the memory 21a will increase. Taking this into account, the storage cycle T is set to the maximum length at which the deviation of the correction amount H with respect to the appropriate value can be made less than the allowable level. Therefore, the necessary storage capacity of the memory can be kept as small as possible, while the deviation of the correction amount H with respect to the appropriate value is made less than the allowable level.

(3) The determination oxygen storage amount OSC that is the value obtained by applying the correction from the correction amount H to the oxygen storage amount OSA calculated every short time Δt is used to determine whether the catalyst is degraded, when there is a reversal between the rich side and the lean side of the output signal VO of the oxygen sensor 18 while active air-fuel ratio control is being executed. In this determination of whether the catalyst is degraded, it is determined that the catalyst is degraded when the determination oxygen storage amount OSC is less than the preset determining value. The determination oxygen storage amount OSC at this time is a value corresponding to the current maximum value of the oxygen storage amount of the catalyst. The maximum value of the oxygen storage amount of the catalyst is a value in which a decrease thereof due to degradation of the catalyst is noticeable. Therefore, as described above, making a determination that the catalyst is degraded when the determination oxygen storage amount OSC is less than the determining value enables this determination to be accurate.

Next, a second example embodiment of the invention will be described with reference to FIG. 11. In addition to the operation in the first example embodiment, this second example embodiment measures the response delay time Tr of the output signal VO of the oxygen sensor 18 based on the output signal VO of the oxygen sensor 18 while the engine 1 is operating, and then variably sets the storage cycle T based on the thus obtained response delay time Tr.

Figure 11:
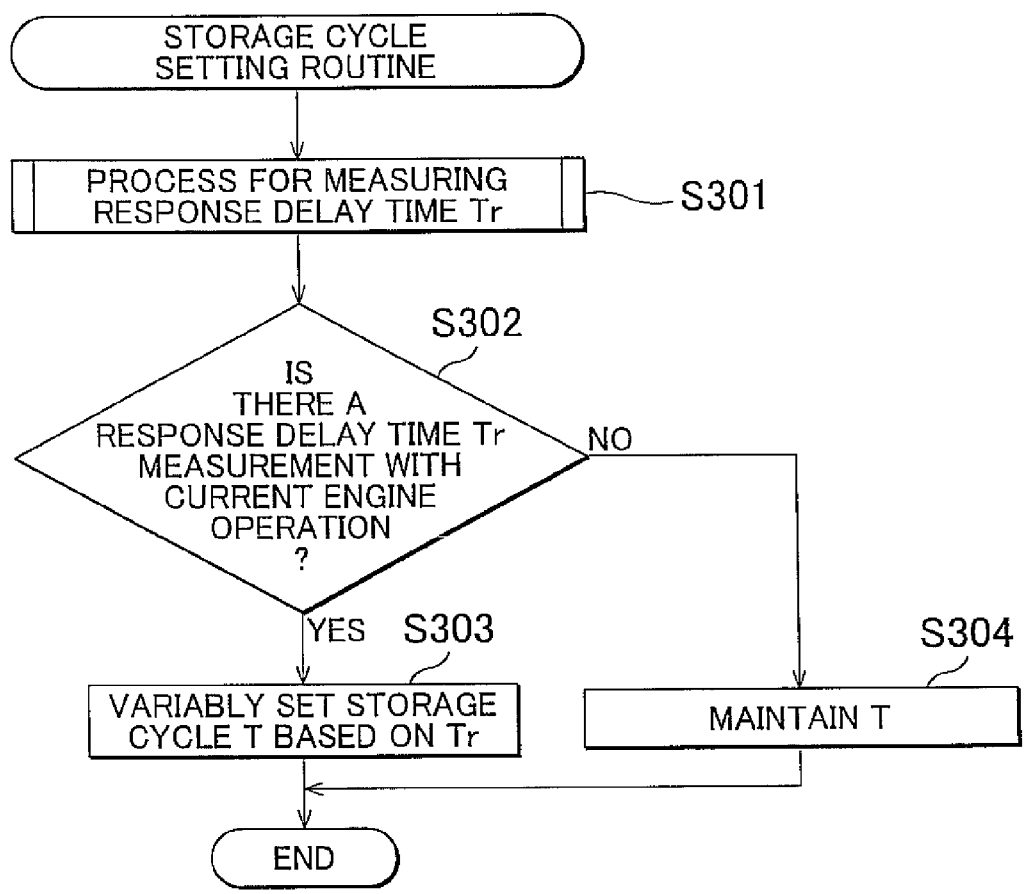
FIG. 11 is a flowchart illustrating a storage cycle setting routine according to a second example embodiment of the invention.

FIG. 11 is a flowchart illustrating a storage cycle setting routine for realizing the variable setting of the storage cycle T described above. This storage cycle setting routine is executed by the ECU 21 in cycles by interrupting every predetermined period of time, for example.

In this routine, first a process for measuring the response delay time Tr is executed (S301). More specifically, in a situation where the air-fuel ratio of the engine 1 changes with a preset width, the time until the output signal VO of the oxygen sensor 18 changes in response to that change is measured, and the response delay time Tr is obtained based on this measured time. An example of a situation in which current engine operation is such that the response delay time Tr can be measured in this way, i.e., of a situation in which current engine operation is such that the air-fuel ratio of the engine 1 changes with a preset width, is when active air-fuel ratio control is executed or when fuel cut control of the engine 1 is executed, for example. Fuel cut control of the engine 1 is control that stops fuel injection in the engine 1 according to the operating state of the vehicle. When fuel injection of the engine 1 is stopped by this control, the air-fuel ratio of the engine 1 will change to the lean side by a certain width in response. It should be noted that the frequency with which fuel injection is stopped by fuel cut control is high compared with the frequency with which fuel injection amount is reduced by active air-fuel ratio control that is executed when an execution condition for active air-fuel ratio control is satisfied.

Continuing on, in step S302, it is determined whether the measurement of the response delay time Tr has just been completed by the measuring process described above with the current engine operation (S302). If the determination here is no, then the current storage cycle T is maintained (S304). If, on the other hand, the determination is yes, the storage cycle T is variably set based on the measured response delay time Tr (S303). More specifically, the length of the storage cycle T is set such that the deviation of the calculated correction amount H with respect to the appropriate value will be less than the allowable level, and such that the length of the storage cycle T is the maximum, according to the response delay time Tr of the output signal VO that matches the current state of the oxygen sensor 18. The appropriate value of the correction amount H is a value that corresponds to the error due to the response delay time Tr in the oxygen storage amount OSA that is used to determine whether the catalyst is degraded.

The example embodiment detailed above is able to yield the effects described below, in addition to the effects of (1) to (3) of the first example embodiment. (4) Even though the response delay time Tr of the output signal VO of the oxygen sensor 18 with respect to a change in the oxygen concentration changes due to individual differences in the oxygen sensor 18 and changes over time and the like, this response delay time Tr is obtained as a value that matches the current state based on the output signal VO that is actually output from the oxygen sensor 18 while the engine 1 is operating. Also, the storage cycle T is variably set based on the thus obtained response delay time Tr. Therefore, the length of the storage cycle T is able to be variably set such that the deviation of the calculated correction amount H with respect to the appropriate value will be less than the allowable level, and such that the length of the storage cycle T is the maximum, according to the response delay time Tr of the output signal VO that matches the current state of the oxygen sensor 18. Setting the length of the storage cycle T in this way makes it possible to keep the necessary storage capacity of the memory 21*a* as small as possible, while making the deviation of the calculated correction amount H with respect to the appropriate value less than the allowable level.

Next, a third example embodiment of the invention will be described with reference to FIG. 12. This example embodiment enables the determination that the catalyst is not degraded (i.e., that the catalyst is normal) in the first example embodiment to be made even earlier.

More specifically, the determination oxygen storage amount OSC is obtained by applying a correction of the correction amount H to the oxygen storage amount OSA each time the oxygen storage amount OSA is calculated, when the oxygen storage amount OSA is calculated every short time Δt while active air-fuel ratio control is being executed. As a result, the determination oxygen storage amount OSC is able to be obtained even when the output signal VO of the oxygen sensor 18 reverses between the rich side and the lean side. Also, a determination that the catalyst is not degraded (i.e., a determination that the catalyst is normal) is made when the determination oxygen storage amount OSC is equal to or greater than the determining value, regardless of whether there is a reversal between the rich side and the lean side of output signal VO of the oxygen sensor 18, while the active air-fuel ratio control is being executed.

Figure 12:
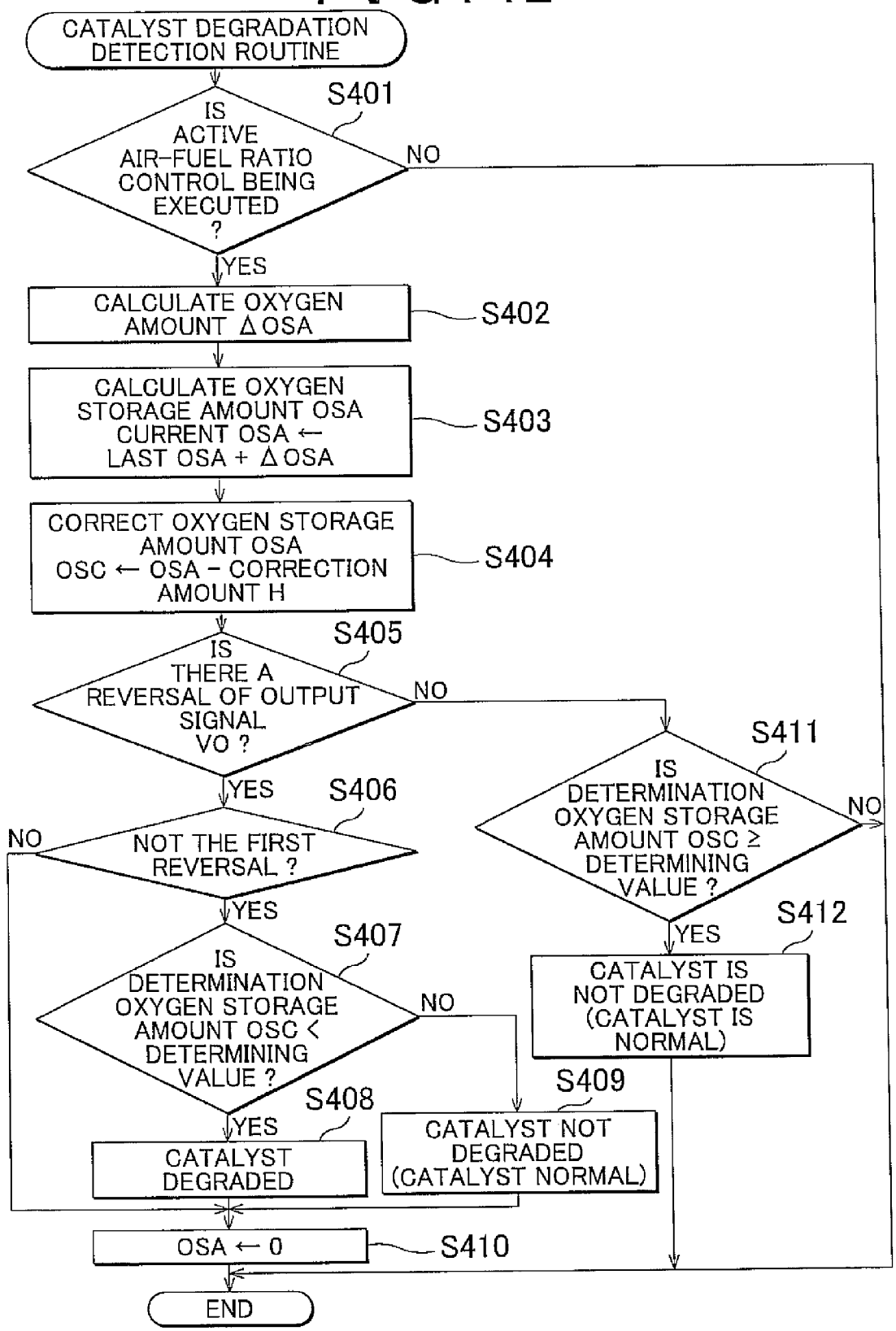
FIG. 12 is a flowchart illustrating a catalyst degradation detection routine according to a third example embodiment of the invention.

FIG. 12 is a flowchart illustrating a catalyst degradation detection routine according to this example embodiment. In this catalyst degradation detection routine, a step (i.e., step S404) corresponding to step S106 in the catalyst degradation detection routine (FIG. 9) of the first example embodiment is executed immediately after steps (i.e., steps S401 to S403) corresponding to steps S101 to S103. Also, steps S411 and S412 for determining that the catalyst is not degraded (i.e., for determining that the catalyst is normal) when there is no reversal between the rich side and the lean side of the output signal VO of the oxygen sensor 18 while active air-fuel ratio control is being executed are added to the catalyst degradation detection routine of the first example embodiment.

In the catalyst degradation detection routine according to this example embodiment, while active air-fuel ratio control is being executed (i.e., YES in step S401), the oxygen amount ΔOSA is calculated (S402), then the oxygen storage amount OSA is calculated (S403), and then the determination oxygen storage amount OSC is calculated by correcting the oxygen storage amount OSA by the correction amount H (S404) in this order. Then when there is a reversal of the output signal VO of the oxygen sensor 18 between the rich side and the lean side (i.e., YES in step S405), if this reversal is the first reversal during the current engine operation (i.e., NO in step S406), the oxygen storage amount OSA is initialized (S410). Also, if the reversal is not the first reversal during the current engine operation (i.e., YES in step S406), then a determination as to whether the catalyst is degraded is made based on the determination oxygen storage amount OSC (steps S407 to S410), similar to the catalyst degradation detection routine (FIG. 9) of the first example embodiment.

However, if active air-fuel ratio control is being executed but there is no reversal of the output signal VO of the oxygen sensor 18 between the rich side and the lean side (i.e., NO in step S405 in FIG. 12), the additional steps described above (i.e., step S411 and S412) are executed. In this series of steps, it is determined whether the determination oxygen storage amount OSC is equal to or greater than a determining value (S411). If the determination here is yes, then it is determined that the catalyst is not degraded, i.e., it is determined that the catalyst is normal (S412), even when there is no reversal between the rich side and the lean side of the output signal VO of the oxygen sensor 18.

The example embodiment detailed above is able to yield the effects described below, in addition to the effects of (1) to (3) of the first example embodiment. (5) The determination that the catalyst is not degraded (i.e., the determination that the catalyst is normal) is made if the determination oxygen storage amount OSC is equal to or greater than the determining value when there is a reversal between the lean side and the rich side of the output signal VO of the oxygen sensor 18 while active air-fuel ratio control is being executed. Furthermore, a determination that the catalyst is not degraded is made if the oxygen storage amount OSA is equal to or greater than the determining value, even if there is no such reversal, while active air-fuel ratio control is being executed. Having a determination that the catalyst is not degraded be made in this way when there is such a reversal, as well as when there is no such reversal, makes it possible for that determination to be made early on when the catalyst is not degraded.

Next, a fourth example embodiment of the invention will be described with reference to FIG. 13. This example embodiment enables the determination that the catalyst is not degraded (i.e., that the catalyst is normal) to be made even earlier by enabling this determination to be made even during normal control of the air-fuel ratio or the like when active air-fuel ratio control is not being executed, such as during normal operation of the engine 1, for example.

Figure 13:
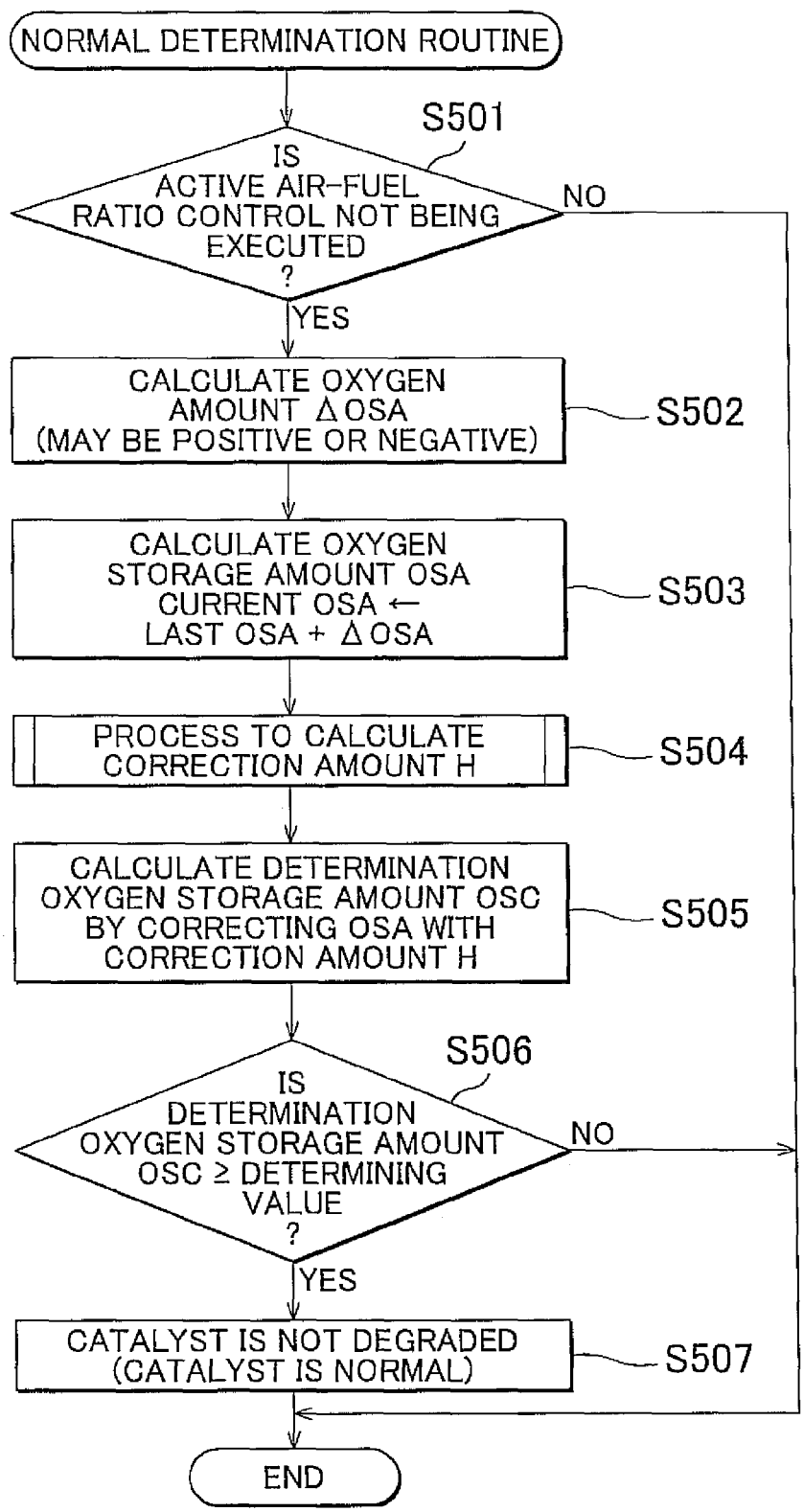
FIG. 13 is a flowchart illustrating a catalyst normal determination routine according to a fourth example embodiment of the invention.
Figure 14:
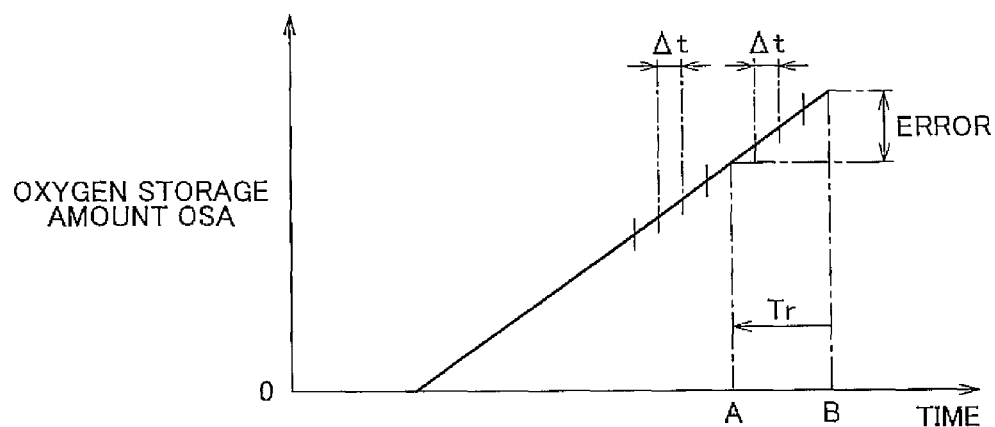
FIG. 14 is a graph of an example of a shift over time in the oxygen storage amount calculated while active air-fuel ratio control is being executed according to related art.
Figure 15:
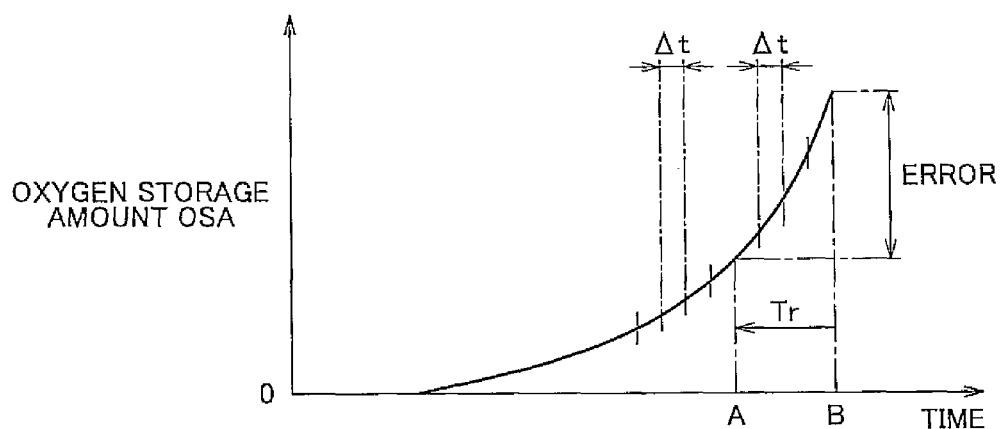
FIG. 15 is a graph of another example of a shift over time in the oxygen storage amount calculated while active air-fuel ratio control is being executed according to related art.

FIG. 13 is a flowchart illustrating a catalyst normal determination routine for determining that the catalyst is not degraded (i.e., that the catalyst is normal) when active air-fuel ratio control is not being executed as described above. This normal determination routine is executed by the ECU 21 in cycles by interrupting every short time Δt.

In this routine, when active air-fuel ratio control is not being executed (i.e., YES in step S501), the oxygen amount ΔOSA is calculated using Expression (1) of the first example embodiment (S502). However, as the air-fuel ratio difference ΔA/F in Expression (1), a value obtained by subtracting the stoichiometric air-fuel ratio from the air-fuel ratio obtained from the output signal VAF of the air-fuel ratio sensor 17 is used instead of the value in the first example embodiment, i.e., instead of the absolute value of the value obtained by subtracting the stoichiometric air-fuel ratio from the air-fuel ratio obtained from the output signal VAF of the air-fuel ratio sensor 17. Therefore, when oxygen is stored in the catalyst during the short time Δt, the calculated oxygen amount ΔOSA is a positive value, and when oxygen is released from the catalyst during the short time Δt, the calculated oxygen amount ΔOSA is a negative value. Next, the oxygen storage amount OSA is obtained by accumulating the oxygen amount ΔOSA each time it is calculated (i.e., every short time Δt) (S503). The oxygen storage amount OSA obtained in this way is the amount of oxygen stored at the current time in the catalyst.

Then, a process for calculating the correction amount H for applying the correction to the oxygen storage amount OSA is executed (S504). More specifically, the correction amount H is calculated by a process similar to the correction amount calculation routine (FIG. 10) of the first example embodiment. However, the process for calculating the correction amount H is performed while active air-fuel ratio control is not being executed, which is different than the first example embodiment. The correction of the thus calculated correction amount H is applied to the oxygen storage amount OSA, and as a result, the determination oxygen storage amount OSC to be used to determine whether the catalyst is degraded is obtained (step S505 in FIG. 13). More specifically, when the oxygen amount ΔOSA is a positive value, a value obtained by subtracting the correction amount H from the oxygen storage amount OSA serves as the determination oxygen storage amount OSC. However, when the oxygen amount ΔOSA is a negative value, a value obtained by adding the correction amount H to the oxygen storage amount OSA serves as the determination oxygen storage amount OSC. If the determination oxygen storage amount OSC is equal to or greater than a determining value (i.e., YES in step S506), it is determined that the catalyst is not degraded, i.e., it is determined that the catalyst is normal (S507). The determining value is set to the same value as the determining value of the first example embodiment (i.e., step S107 in FIG. 9) and the determining value of the third example embodiment (i.e., steps S407 and S411 in FIG. 12).

The example embodiment detailed above is able to yield the effects described below, in addition to the effects of (1) to (3) of the first example embodiment. (6) A determination that the catalyst is not degraded can be made even when active air-fuel ratio control is not being executed, so when the catalyst is not degraded, this determination can be made even earlier.

The example embodiments described above may also be modified as described below, for example. In the first to the fourth example embodiments, the air-fuel ratio difference ΔA/F for calculating the oxygen amount ΔOSA released per short time Δt may be estimated based on the fuel injection quantity Q and the detection signal from the airflow meter 32, instead of being calculated based on the output signal VAF of the air-fuel ratio sensor 17.

In the first to the fourth example embodiments, the oxygen amount ΔOSA stored per short time Δt in the catalyst may be calculated from the start of a fuel cut in fuel cut control through the fuel cut, and it may be determined whether the catalyst is degraded based on the oxygen storage amount OSA (i.e., the determination oxygen storage amount OSC) obtained by accumulating this oxygen amount ΔOSA. Also, after the fuel cut of the fuel cut control has ended, oxygen amount ΔOSA released per short time Δt from the catalyst may be calculated, and it may be determined whether the catalyst is degraded based on the oxygen storage amount OSA (i.e., the determination oxygen storage amount OSC) obtained by accumulating this oxygen amount ΔOSA.

When the oxygen storage amount OSA (i.e., the determination oxygen storage amount OSC) is obtained using fuel cut control as described above, the air-fuel ratio difference ΔA/F for calculating the oxygen amount ΔOSA stored per short time Δt may be estimated based on the time that has passed after the start of the fuel cut, instead of being calculated based on the output signal VAF of the air-fuel ratio sensor 17.

In the first example embodiment, the determination oxygen storage amount OSC may be obtained by applying a correction of the correction amount H immediately after the oxygen storage amount OSA is calculated every short time Δt, as in the third example embodiment.

In the first example embodiment, the length of the storage cycle T may be set such that the number k of the slopes θn stored in the memory 21a becomes a value other than 7. In the first to the fourth example embodiments, an oxygen sensor may be provided instead of the air-fuel ratio sensor 17 as the catalyst upstream sensor.

In the first to the fourth example embodiments, an air-fuel ratio sensor may be provide instead of the oxygen sensor 18 as the catalyst downstream sensor.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A catalyst degradation detection apparatus that includes:
    an oxygen storage amount calculating portion that calculates, every preset short time, an amount of oxygen stored in a catalyst provided in an exhaust passage of an internal combustion engine, or an amount of oxygen released from the catalyst, during the short time, and sets a value obtained by accumulating the amount of oxygen at each calculation as an oxygen storage amount of the catalyst, and
    a catalyst downstream sensor that is provided downstream of the catalyst in the exhaust passage and that outputs a signal based on an oxygen concentration in exhaust gas, wherein a determination of whether the catalyst is degraded is made based on the oxygen storage amount calculated by the oxygen storage amount calculating portion, when there is a reversal, between a lean side and a rich side with respect to a value corresponding to the oxygen concentration in the exhaust gas when fuel is combusted at a stoichiometric air-fuel ratio, of the signal of the catalyst downstream sensor,
    the catalyst degradation detection apparatus comprising:
    a correcting portion that, when determining whether the catalyst is degraded based on the oxygen storage amount calculated by the oxygen storage amount calculating portion, applies a correction of a correction amount that corresponds to a response delay time with respect to a change in the oxygen concentration of the signal of the catalyst downstream sensor to the oxygen storage amount;
    a first storage portion that stores the oxygen storage amount calculated by the oxygen storage amount calculating portion in memory in place of a last value as a storage value in each storage cycle that is a time interval that is longer than the short time;
a slope calculating portion that calculates a slope of a change in the oxygen storage amount calculated by the oxygen storage amount calculating portion with respect to the storage value every short time; and
a second storage portion that stores the slope calculated by the slope calculating portion in the memory in each storage cycle,
wherein the second storage portion stores, separately in the memory, only the slopes for the number of the storage cycles corresponding to the response delay time of the signal of the catalyst downstream sensor, from among the slopes calculated by the slope calculating portion,
and wherein the correction amount is calculated based on the slopes stored in the memory, the storage cycle, the response delay time, and a period of time that has passed after the end of the last storage cycle.

2. The catalyst degradation detection apparatus according to claim 1, wherein the storage cycle is set to a maximum length at which a deviation of the calculated correction amount with respect to an appropriate value is less than an allowable level.

3. The catalyst degradation detection apparatus according to claim 1, wherein the response delay time with respect to a change in the oxygen concentration of the signal of the catalyst downstream sensor is obtained based on the signal output from the catalyst downstream sensor while the internal combustion engine is operating; and the storage cycle is variably set based on the obtained response delay time.

4. The catalyst degradation detection apparatus according to claim 1 wherein when the oxygen storage amount of the catalyst is calculated by the oxygen storage amount calculating portion, active air-fuel ratio control that first forces an air-fuel ratio of the internal combustion engine rich or lean and then reverses the air-fuel ratio of the internal combustion engine between rich and lean each time there is a reversal of the signal of the catalyst downstream sensor between the lean side and the rich side with respect to the value corresponding to the oxygen concentration in the exhaust gas when fuel is combusted at the stoichiometric air-fuel ratio is executed based on a preset condition, and the oxygen storage amount is calculated by the oxygen storage amount calculating portion from after the air-fuel ratio of the internal combustion engine reverses between rich and lean according to the active air-fuel ratio control until there is a reversal of the signal of the catalyst downstream sensor between the lean side and the rich side, and when there is a reversal of the signal of the catalyst downstream sensor between the lean side and the rich side, it is determined that the catalyst is degraded if a determination oxygen storage amount, that is a value obtained by applying the correction of the correction amount according to the correcting portion to the oxygen storage amount calculated by the oxygen storage amount calculating portion, is less than a determining value.

5. The catalyst degradation detection apparatus according to claim 4, wherein the correcting portion obtains the determination oxygen storage amount by applying the correction of the correction amount to the oxygen storage amount each time the oxygen storage amount is calculated by the oxygen storage amount calculating portion at a point at which the short time has passed, in order to realize the correction of the correction amount of the oxygen storage amount when there is a reversal of the signal of the catalyst downstream sensor between the lean side and the rich side according to the active air-fuel ratio control; and it is determined that the catalyst is not degraded if the determination oxygen storage amount is equal to or greater than the determining value, regardless of whether there is a reversal of the signal of the catalyst downstream sensor between the lean side and the rich side.

6. The catalyst degradation detection apparatus according to claim 4, wherein when the active air-fuel ratio control is not being executed, the oxygen storage calculating portion calculates an amount of oxygen stored in the catalyst during the short time as a positive value every short time, and calculates an amount of oxygen released from the catalyst during the short time as a negative value every short time, and sets a value obtained by accumulating the amounts of oxygen at each calculation as the oxygen storage amount of the catalyst; the correcting portion obtains the determination oxygen storage amount by correcting the oxygen storage amount by the correction amount each time the oxygen storage amount is calculated by the oxygen storage amount calculating portion at a point at which the short time has passed when the active air-fuel ratio control is not being executed; and it is determined that the catalyst is not degraded if the determination oxygen storage amount is equal to or greater than the determining value, when the active air-fuel ratio control is not being executed.

7. A catalyst degradation detection method comprising:
calculating an amount of oxygen stored in a catalyst provided in an exhaust passage of an internal combustion engine, or an amount of oxygen released from the catalyst, during a preset short time, and calculating an oxygen storage amount of the catalyst by accumulating the amount of oxygen at each calculation, and
when there is a reversal between a lean side and a rich side with respect to a value corresponding to an oxygen concentration in exhaust gas when fuel is combusted at a stoichiometric air-fuel ratio, of a signal that is based on the oxygen concentration in the exhaust gas and output from a catalyst downstream sensor provided downstream of the catalyst in the exhaust passage, calculating a determination oxygen storage amount by applying a correction of a correction amount that corresponds to a response delay time with respect to a change in the oxygen concentration of the signal of the catalyst downstream sensor, to the calculated oxygen storage amount, and determining whether the catalyst is degraded based on the determination oxygen storage amount,
wherein the correction amount is determined by storing the calculated oxygen storage amount in memory in place of a last value as a storage value in each storage cycle that is a time interval that is longer than the short time, by calculating a slope of a change in the calculated oxygen storage amount with respect to the storage value every short time, by storing, separately in the memory, only the slopes for the number of the storage cycles corresponding to the response delay time of the signal of the catalyst downstream sensor, from among the calculated slopes, and by calculating based on the slopes stored in the memory, the storage cycle, the response delay time, and a period of time that has passed after the end of the last storage cycle.

* * * * *